US005612735A

United States Patent [19]
Haskell et al.

[11] Patent Number: 5,612,735
[45] Date of Patent: Mar. 18, 1997

[54] DIGITAL 3D/STEREOSCOPIC VIDEO COMPRESSION TECHNIQUE UTILIZING TWO DISPARITY ESTIMATES

[75] Inventors: Barin G. Haskell, Tinton Falls; Richard V. Kollarits, Colts Neck, both of N.J.; Atul Puri, Riverdale, N.Y.

[73] Assignee: Luncent Technologies Inc., Murray Hill, N.J.

[21] Appl. No.: 452,464

[22] Filed: May 26, 1995

[51] Int. Cl.⁶ .................................................. H04N 13/00
[52] U.S. Cl. .................... 348/43; 348/409; 348/47
[58] Field of Search ............................ 348/42, 43, 48, 348/46, 47, 384, 390, 401, 409, 412, 415, 416

[56] References Cited

U.S. PATENT DOCUMENTS

| | | | |
|---|---|---|---|
| 5,142,642 | 8/1992 | Sudo | 348/47 |
| 5,296,926 | 3/1994 | Nagura | 348/43 |
| 5,329,365 | 7/1994 | Uz | 348/384 |

Primary Examiner—Amelia Au
Attorney, Agent, or Firm—Mark K. Young

[57] ABSTRACT

Efficient digital compression of 3D/stereoscopic video is achieved by a novel technique in which various views forming 3D/stereoscopic video are coded by utilizing the redundancies among the views. Coding is performed in a manner compatible with existing equipment to allowing decoding of one layer of video for display on normal (i.e., monoscopic) displays. The motion compensated discrete cosine transform ("DCT") coding framework of existing standards such as the Motion Pictures Expert Group-Phase 2 ("MPEG-2") video standard is exploited, and when necessary extended, to result in highly efficient, yet practical, coding schemes. In constrast with known techniques of encoding the two views forming stereoscopic video which rely on the use of a disparity estimate between the two views (where one of the views is the reference, coded by itself and the other is disparity compensated predicted and coded with respect to the reference view), the present techniques utilize two disparity estimates: one disparity estimate which allows forward prediction and other disparity estimate allowing backward prediction with respect to the reference view.

1 Claim, 13 Drawing Sheets

DIGITAL 3D/STEREOSCOPIC VIDEO COMPRESSION TECHNIQUE UTILIZING TWO DISPARITY ESTIMATES

CROSS REFERENCE TO RELATED APPLICATION

U.S. patent application Ser. No. 08/452,463 was filed concurrently herewith.

TECHNICAL FIELD

This invention relates to encoding and decoding of video signals. More particularly, this invention relates to a digital 3D/stereoscopic video compression technique utilizing two disparity estimates.

BACKGROUND OF THE INVENTION

Although the human visual system can naturally capture the three dimensional world, most imaging and display systems limit our abilities by presenting only a two dimensional ("2D") mapping of the three dimensional ("3D") world. Many current as well as emerging applications can significantly benefit from the high degree of realism provided by 3D scenes with depth. In fact, human ability to perceive realism in a scene is directly related to our ability to perceive depth accurately in the scene. A real 3D scene can be reconstructed from many 2D views of a scene imaged from different perspectives. Such a representation would not only allow the perception of depth in a scene but look-around capability as well. However, due to practical display constraints, although only a less complex solution employing two views of a scene is easily realizable, it can still impart the sensation of depth. Thus, two views are required to be imaged under specific constraints—one for each eye of a human visual system—so that our brain can generate the depth information necessary to perceive realism. The two views, when put together in a video format, can represent stereoscopic video. Each view is similar to normal video except that the two views are related under the constraints imposed by stereoscopic vision. Under specified constraints, the two views imaging a scene differ by what is known as disparity between the views, which is typically only a few pixels in vertical direction but can be of the order of about 40 pixels or higher in the horizontal direction, assuming each view is imaged at normal TV resolution.

Stereoscopic video has potential applications in education, training, 3D movies/entertainment, medical surgery, videoconferencing, virtual travel and shopping, multimedia presentations, video games and immersive virtual reality experiences, and others. Although, many potential applications of 3D/stereoscopic video exist, there are several limitations to be overcome before 3D/stereoscopic video potential can be truly harnessed, and its use becomes wide spread. One example of such a limitation is that a practical means of displaying stereo requires viewers to use specialized viewing glasses. Although some displays do not require specialized viewing glasses, for example, autostereoscopic systems, they impose other restrictions, for example, limited viewing zones and view discreteness. Moreover, such systems may typically require between 10 and 20 views for realism. Stereoscopic video, on the other hand, although it requires use of specialized glasses, can impart perception of depth in a scene and requires only two views: one is referred to as the left-view and other is referred to as the right-view, which are intended for presentation to the left-eye and the right-eye, respectively, of a human visual system in either time-sequential (with active synchronized shuttered glasses) or time-simultaneous (with passive polarizing glasses).

In addition to the aforementioned display issue, another issue of concern is efficient digital compression of 3D/stereoscopic video so that the multiple views can be easily manipulated, stored or transmitted as needed. Towards that end, interworking with existing or emerging standards based coding schemes as well as existing displays for normal video is highly desirable.

SUMMARY OF THE INVENTION

Efficient digital compression of 3D/stereoscopic video is achieved, in accordance with the invention, by a novel technique in which various views forming 3D/stereoscopic video are coded by utilizing the redundancies among the views. Coding is performed in a manner compatible with existing equipment to allowing decoding of one layer of video for display on normal (i.e., monoscopic) displays. The motion compensated discrete cosine transform ("DCT") coding framework of existing standards such as the Motion Pictures Expert Group-Phase 2 ("MPEG-2") video standard is exploited, and when necessary extended, to result in highly efficient, yet practical, coding schemes.

In constrast with known techniques of encoding the two views forming stereoscopic video which rely on the use of a disparity estimate between the two views (where one of the views is the reference, coded by itself and the other is disparity compensated predicted and coded with respect to the reference view), the techniques in accordance with principles of the invention utilize two disparity estimates: one disparity estimate which allows forward prediction and other disparity estimate allowing backward prediction with respect to the reference view. Three novel methods for combining these estimates for prediction are provided, in accordance with the invention. The first method chooses between the two disparity compensations depending on which provides the best prediction; the second method allows choice between either of the two disparity predictions and an averaged of the two predictions; and, third, choice between various combinations resulting from prespecified weightings applied to the two disparity compensated predictions. Such a technique, advantageously, represents a significant improvement over known techniques in achieving high-efficiency digital compression of 3D/Stereoscopic video, and advantageously is fully compatible with existing video compression standards. Furthermore, although digital broadcast service for 3D/stereoscopic television can be realized by the practice of the invention immediately, full compatibility with normal video displays is provided, allowing gradual introduction of high quality stereoscopic displays in future.

DETAILED DESCRIPTION OF THE INVENTION

Figure 1:
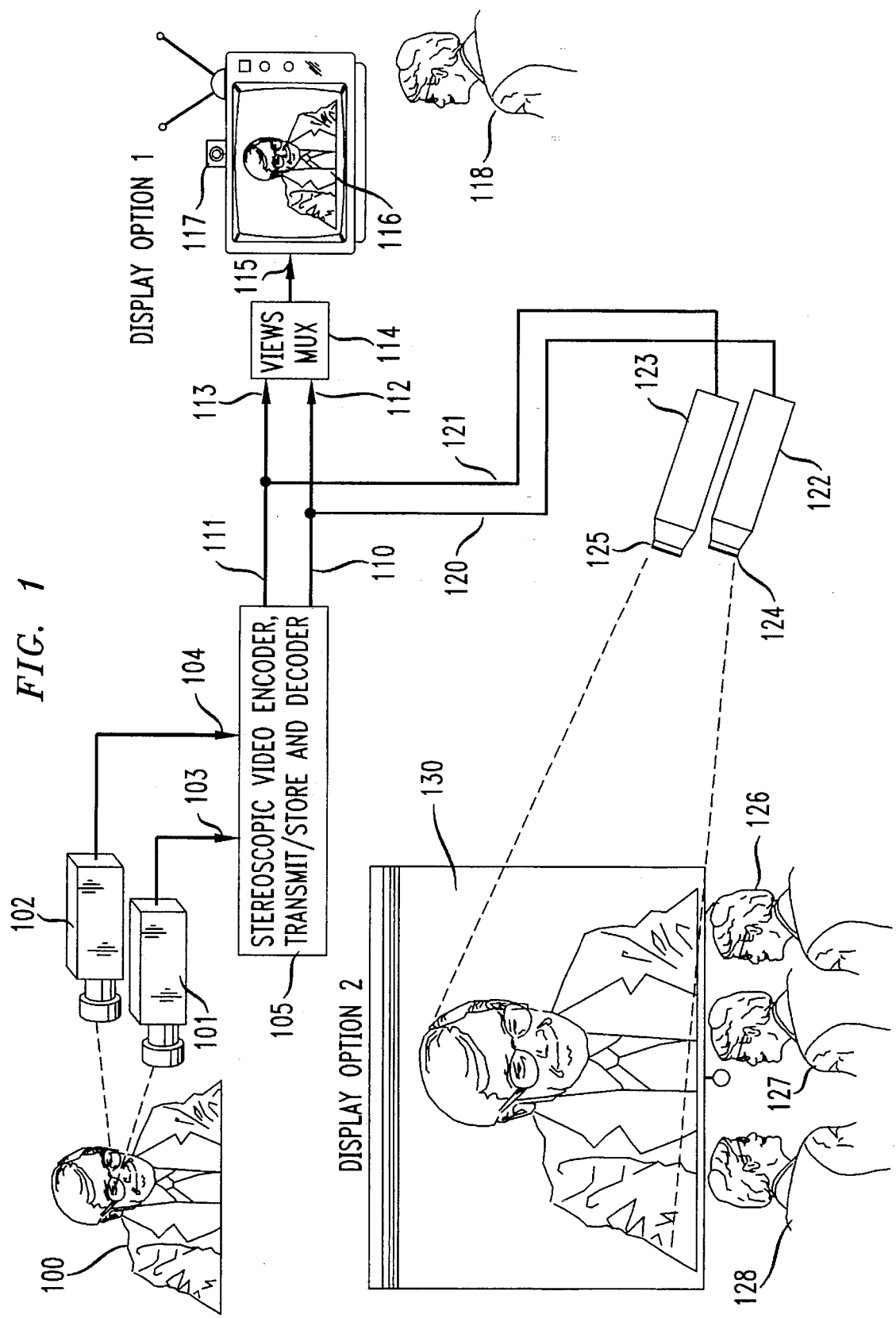
FIG. 1 shows a simplified diagram which illustrates certain principle of stereoscopic imaging and display.

At the onset it is noted that while this invention is primarily concerned with the issue of efficient digital compression of stereoscopic video, the techniques described herein can be readily extended to coding of more then two views (hereinafter referred to as multi-views). While it is possible to encode each of the two views of stereoscopic video separately (i.e, as with simulcast techniques), it is envisaged that combined coding of two views would be more efficient, since the two views are very related and contain significant redundancies which can be exploited for compression. It is possible to achieve joint coding of stereoscopic video by two basic approaches. The first approach results in compatibility with normal video in the sense that one view of stereoscopic video may be decoded for normal video display, while both views could be decoded for stereoscopic display. The second approach involves joint coding without regard to compatibility with monoscopic video, and presumably a higher degree of compression may be achieved. It is expected that each of the two basic approaches may be equally suitable depending on the application. However, the present invention is particularly focused on only a compatible solution for compression of stereoscopic video. Of particular relevance to our discussion is the second phase MPEG-2 video coding standard, which although only recently completed, is well recognized as offering a satisfactory solution to a large variety of applications requiring digital video including broadcast TV via satellite, cable TV, high-definition television ("HDTV"), digital VCRs, multipoint video and others. The present invention, as it offers a compatible solution for a future digital broadcast 3DTV service, builds on and extends MPEG-2 video coding, which is also currently employed in commercial broadcast TV services such as, digital TV (via direct broadcast satellite or cable) and digital HDTV (via terrestrial means) in near future.

Both the single layer (i.e., nonscalable) video coding, as well as the layered (i.e., scalable) video coding framework of MPEG-2 video coding is exploited and extended by present invention. Nonscalable video coding in MPEG-2 involves motion-compensated DCT coding of frame- or field-pictures and is known. Among the scalable video coding schemes, the techniques in accordance with invention have a slight relationship with techniques used in spatial scalability, but is highly related to temporal scalability. Temporal scalability involves coding of video as two layers in time, such that the first layer, called base layer, can be decoded independent of the second layer, called the enhancement- layer. The base-layer can be coded with any coder, such as, motion compensated DCT coders of CCITT recommensation H.261, Motion Pictures Expert Group-Phase 1 Standard ("MPEG-1"), or nonscalable MPEG-2, while the enhancement-layer also uses the motion compensated DCT structure but with temporal prediction from the base-layer. Since, there are no explicit restrictions on which coders to employ in the base- and enhancement-layers other than the use of temporal prediction between layers, the underlying framework of temporal scalability exploited and extended in our invention should be applicable to the extensions of MPEG-2 for multi-view coding being discussed in MPEG-2, as well as, multiple concurrent datastreams functionality being discussed for the future Motion Picture Experts Group-Phase 4 ("MPEG-4") standard In the past, several attempts have been made to reduce the bandwidth of analog stereoscopic video by reducing line rate of each view by a factor of two and multiplexing two half line rate signals to form one signal which is stored or manipulated as normal TV signal. Another attempt included reduction of horizontal bandwidth by filtering and subsampling before multiplexing in digital domain, however, no further compression was carried out. Among the more recent attempts are fully digital coding methods that use disparity compensation between the views, and more notably, a block motion compensated DCT structure that allows a block based switch between disparity and motion compensated predictions. The present invention represents the next significant step in high efficiency digital compression of stereoscopic video by using more than one disparity estimates or combining disparity and motion estimates in even more novel ways to maximize coding efficiency. Herein, a description of the details of the invention is provided in context with the framework of the nonscalable and the scalable MPEG-2 video compression standard and its proposed extensions.

We now describe in detail, the framework, apparatus and methods of this invention to yield efficient compression of stereoscopic video while preserving compatibility with normal video displays.

FIG. 1 shows a typical stereoscopic video imaging, procesing and display system. A scene, 100, is captured by a stereoscopic camera composed of individual camera or lenses 101 and 102, where camera 101 generates left- view of the scene and camera 102 generates the right-view of the scene. In a stereoscopic video system, the left-view is intended for the left-eye and the right-view is intended for right-eye of a human observer. The left- and right-views at lines 103 and 104 are digitized and encoded for efficient representation for transmission or storage and are then decoded for display. The operations of encoding, transmission/storage and decoding are represented by 105, at whose output, the decoded left-view and the right-views are available on lines 110 and 111. There are two ways of displaying the output, the first one, time multiplexed with active viewing LCD shutter eyeglasses, and the second one, time simultaneous with passive polarizing eyeglasses. In display option 1, the left- and the right-views on lines 112 and 113 are time multiplexed sequentially in 114 to form a sequence output at 115 composed of left-view frame, right-view frame and so on. The signal on line 115 is input to a stereo-ready monitor or TV receiver 116 which uses a shutter synchronizer 117 to control timing of when the left and right views are presented to human visual system by LCD shuttering glasses 118. In the display option 2, the left and right views are input to projectors 122 and 123 over lines 120 and 121 respectively. Projectors 122 and 123 have polarizing filters 124 and 125 placed on lenses, these polarizers are either both linear or both circular and are matched to the passive eyeglasses 126, 127 and 128. Thus, if linear polarizers are chosen, the filter 124 on projector 122 is linear but left hand polarized and filter 125 on projector 123 is also linear but is right hand polarized. Likewise, the left lens and the right lens of passive eyeglasses 126, 127, 128 have linear left hand polarizing filters and linear right hand polarizing filters respectively. The image of scene 100 is formed on screen 130 which has metallic content to preserve the direction of polarization.

Figure 2:
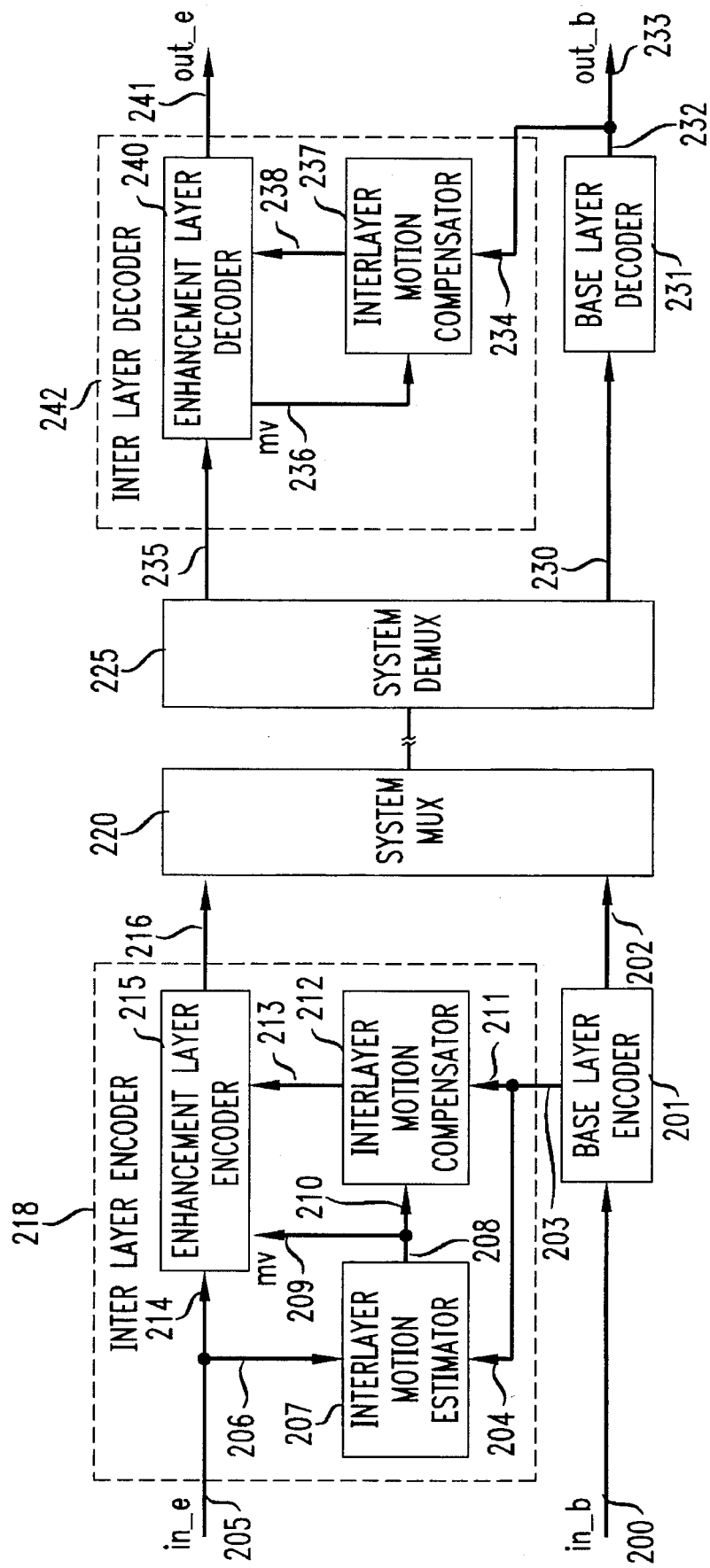
FIG. 2 is a generalized block diagram of a temporal scalability coder/decoder ("codec") in accordance with the known MPEG-2 video standard.

FIG. 2 is a generalized block diagram of a temporal scalability codec for two layers of video. A video signal is input on line 200 to the base-layer encoder, 201, which outputs coded bitstream on line 202 and locally reconstructed frames on line 203. The other (related) video signal is input on line 205 and applied to interlayer motion estimator, 207, which estimates motion vectors between, for example, blocks of input frame on 206 with respect to a decoded frame from base- layer on line 204. These motion vectors appear on line 208 and are available to 2 12 for motion compensation and are also sent on line 209 to enhancement-layer encoder, 215. The motion compensator 212 uses base-layer locally decoded signal on line 211 and motion vectors on line line 210 to generate motion compensated prediction signal on line 213. The bitstream generated by enhancement-layer encoder on line 216 and the bitstream from base-layer encoder on line 202 are multiplexed in system multiplexer, 220 for transmission or storage over 222. At the decoder, system multiplexer, 225 identifies the base- and enhancement-bitstreams and inputs them to base-layer decoder, 231, and to enhancement-layer decoder 240 via lines 230 and 235 respectively. The decoded output of base-layer on line 232 is provided via line 234 to motion compensator, 237, which uses decoded motion vectors on line 236 to generate motion compensated prediction signal on line 238 for use by enhancement-layer decoder, 240. The base- and enhancement-layer decoded signals are available on lines 233 and 241. The interlayer motion compensator, 237 is exactly identical to the interlayer compensator, 212, at the encoder. The enhancement-layer encoders and decoders, like the base-layer encoders and decoder, can also for example, be motion compensated DCT encoders and decoders. The only difference is that the enhancement-layer, unlike the base-layer, is not standalone, but uses prediction from from the base-layer. The enhancement-layer encoder with associated interlayer motion estimation and compensation is called interlayer encoder, 218, and the enhancement-layer decoder with associated interlayer motion compensation is called interlayer decoder, 242.

Prior to discussin the inventive technique for the compression of stereoscopic video, it should be emphasized that technique is designed to allow compatibility with decoding and display of normal (i.e., monoscopic) video. This is accomplished by using layered coding concepts or scalability concepts. In near future, digital video compressed by MPEG-1 or nonscalable MPEG-2 standard is expected to be a normal practice in many applications, and decoders capable of decoding MPEG-1 or nonscalable MPEG-2 bitstreams to be part of digital consumer and professional VCR's, HDTV home systems, video-CD players, multimedia PC's, set top boxes for cable and satellite TV systems. In the present approach to 3D/stereoscopic video compression, a layer of independently coded video is used as the basis for coding other layer/s dependently with respect to it. It is envisaged that this independently coded layer can be decoded for normal video displays, whereas all layers may be decoded by specialized decoders that allow 3D/stereoscopic display. Quite often, for stereoscopic video, the left-view signal is the independently coded signal that can be decoded for normal display, and right view is the dependent signal, such that both views are decoded by specialized stereoscopic video decoders only. However, in accordance with the principles of the invention, the interchange of views for dependent and independent coding represents only an small change to present technique.

Figure 3:
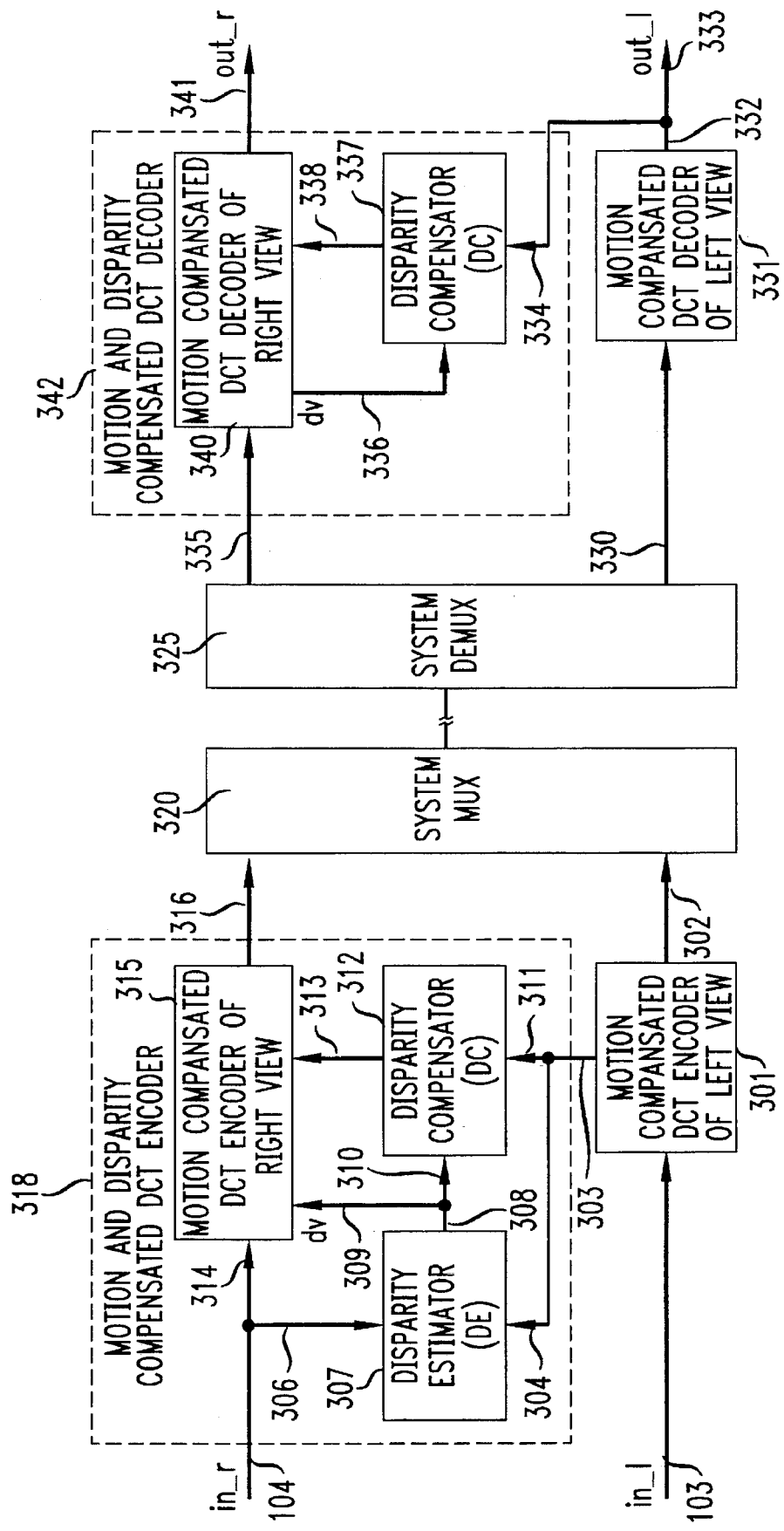
FIG. 3 shows a illustrative and generalized temporal scalability codec for stereoscopic video, in accordance with the invention.

FIG. 3 is a simplified block diagram of a stereoscopic video codec, in accordance with the invention. FIG. 3 builds on the basic structure of the temporal scalability codec discussed when referring to FIG. 2. Stereoscopic video as described in FIG. 1 is composed of the left-view signal, 103, and the right-view signal, 104. In this illustrative example, the left view signal, 103, is to be coded independently, whereas the right-view signal, 104 is coded with respect to the locally decoded left-view signal. It is emphasized that this choice is arbitrary and could be reversed. The left-view signal on line 103 is input to left-view encoder, 301, which is, in this illustrative example, a motion compensated DCT encoder. Left view encoder 301 outputs a coded bitstream on line 302 and reconstructed frames on line 303. The right-view signal is input on line 305, and applied to disparity estimator, 307, which estimates disparity vectors between blocks of input frames on line 306 with respect to locally decoded left-view signal on line 304. The estimation of disparity vectors could also be performed between blocks of original frames of right view signal on line 306 and original frames of left-view signal on line 103. Furthermore, although FIG. 3 shows disparity estimation with respect to locally decoded left-view frames, it is emphasized that a codec employing any of the two ways of computing disparity estimates is intended to fall within the scope of the invention. These disparity vectors appearing on line 308 are applied to disparity compensator and are also sent on line 309 to right-view encoder on line 315. The disparity compensator, 312, uses the locally decoded left-view signal on line 311 and disparity vectors on line 310 to generate disparity compensated prediction signal on line 313. The bitstream output from right-view encoder on line 316 and the bitstream of left-view encoder on line 302 are multiplexed in system multiplexer 320 for transmission or storage over line 322. At the decoder, system demultiplexor 325 identifies left-view and right-view portions of the bitstreams and inputs corresponding dfecoders 331 and 340 via lines 330 and 335 respectively. The decoded left-view output is available to disparity compensator, 337, which uses decoded disparity vectors to generate disparity compensated prediction signal on line 338 for use by right-view decoder, 340. The left- and right-view decoded signals are available on lines 333 and 341. The disparity compensator 337 is identical in form and operation to the disparity compensator 312 at the encoder. An example of disparity estimator and compensator include block matching motion estimators and compensator with certain restrictions which are discussed in detail later. Additionally, in the codec structure of FIG. 3, not only does the right-view encoder/decoder uses disparity compensated signal from left-view, but also uses the motion compensated signal from right-view, which is generated internally in encoder 315, and decoder 340. The different means for combining the two signals forms the core of our invention and is discussed in detail later. As an example of a practical coding scheme using codec structure described earlier, the left-view encoder/decoder could be an MPEG-1 or a nonscalable MPEG-2 (i.e., simple or main profile) encoder/decoder, whereas the right-view encoder/decoder could be a temporal scalability encoder/decoder, albeit, with modified syntax and/or semantics.

Figure 4:
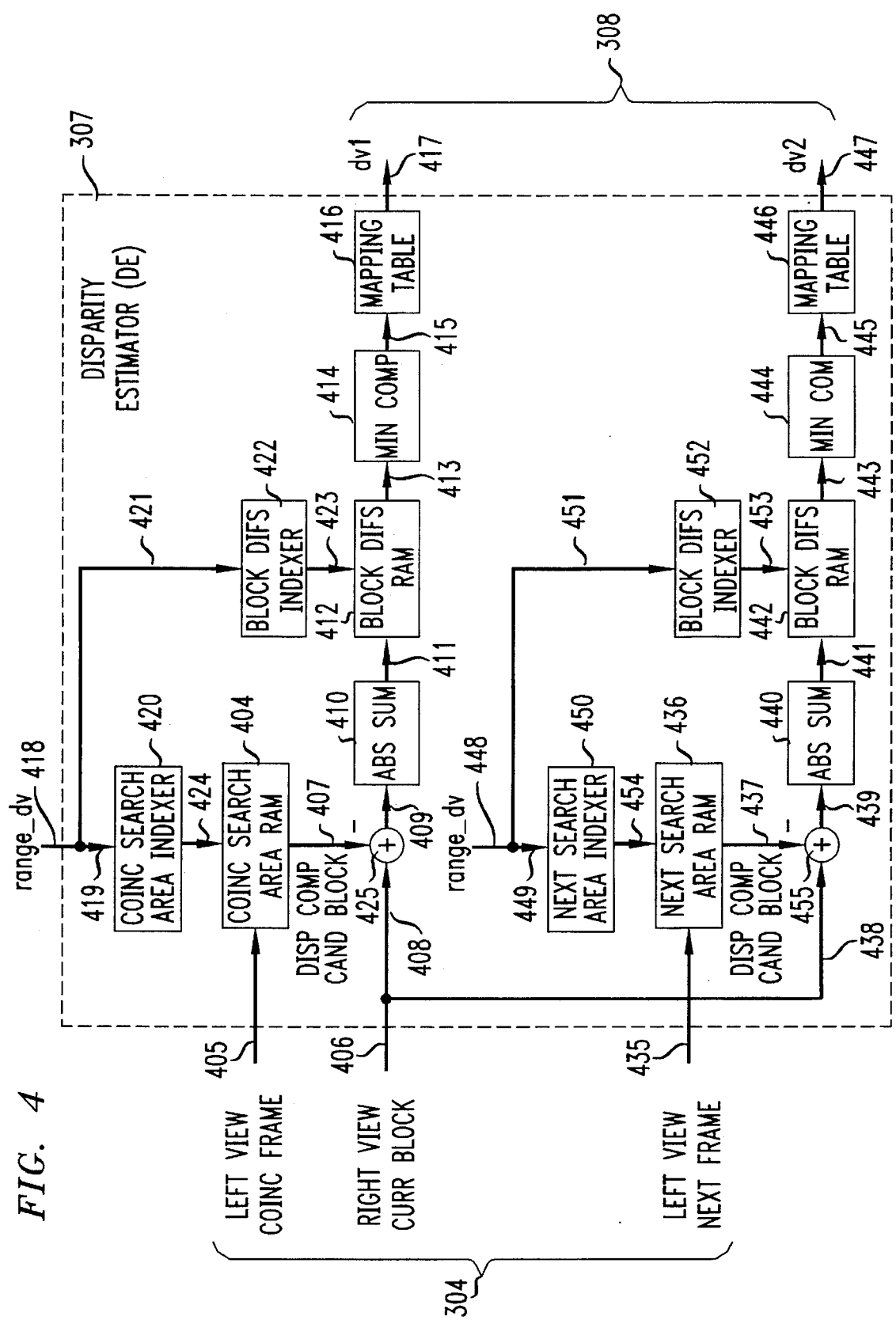
FIG. 4 shows an illustrative disparity estimator for block based coding of stereoscopic video.

FIG. 4 shows details of an example disparity estimator 307 of FIG. 3. Although, for simplicity, use is made of a block based disparity estimator, any other other type of disparity estimator. For example, an estimator providing disparity estimates for arbitrary two-dimensional regions or three dimensional objects could be substituted. Disparity estimator 307 generates two disparity vectors, 417 and 447, for blocks of current right-view frame on line 404, with respect to left-view coincident frame on line 405 and left-view next frame on line 435. The disparity estimator of FIG. 4 has considerable similarities with typical block matching motion estimators. Blocks of current frame of right-view enter on line 404 and are applied to a differencer at one input 408, while a disparity compensation candidate prediction block is applied at the other input of this differencer 407. The right view blocks input line 404 is same as line 306, but is referred to as 404 hereafter. Absolute value of differences of pixels and sum of these absolute values are computed to estimate a block prediction error in 410. The prediction block on line 407 at one input of the differencer 425 was obtained by first generating a index into search area stored in memory RAM 406. The index is generated by previous search area indexer 420 under the constraints of search area range, an input parameter on line 418 and applied to 420 through line 419. The search area indexer sequentially generates indices for every candidate block in memory RAM 406 and this index is bounded by search area range specified on line 418; one by one each candidate block for disparity compensation is read out on line 407 while each block of right view frame being processed is held steady. The summed absolute prediction errors on line 411 for each candidate block from line 407 are stored temporarily in block differences memory RAM 412 and sent one-by-one to minimum computer, 414, over line 413. The minimum computer 414, supplies an index corresponding to the candidate block that provides the least block prediction error, to a mapping table which translates this index to a disparity vector consisting of x and y components. This disparity vector is output on line 417 and at this time, computation of a disparity for one block is complete. Disparity estimator, 307, allows computation of up to two disparity vectors per input block of right view frame. The computation of the second disparity vector takes place in a separate circuit and mimicks the entire sequence of operations explained earlier. For example, the next frame of left view is input on line 435 and under control of next search area indexer, 450, generates an index to the search area read into memory RAM 436 from input frame on line 435. This index on line 454 causes a candidate block for disparity compensation to be read from memory RAM 436 to line 437 and input to differencer 455, at whose other input on line 438, is the current block of pixels at line 404. The sum of absolute values of differences on line 439 is input to 430 to generate block absolute difference signal which is temporarily saved in memory RAM 442. The search area indexer generates the next address of a candidate block which is obtained from search area RAM 436 and block absolute differences computed and stored in memory RAM 442. For all the valid candidate blocks for disparity estimation, a determination of the one producing the smallest prediction error is performed in the minimum computer 444, whose output on line 445 is mapped to determine the best disparity vector, dv2, which is output on line 447. Next, the previous search area memory RAM 406 and memory RAM 436 are updated from left view coincident frame on line 404 and left view next frame on line 435 respectively, for every block of right view frame on line 404. The process repeats until the new block on line 404 is processed and so on.

Figure 5:
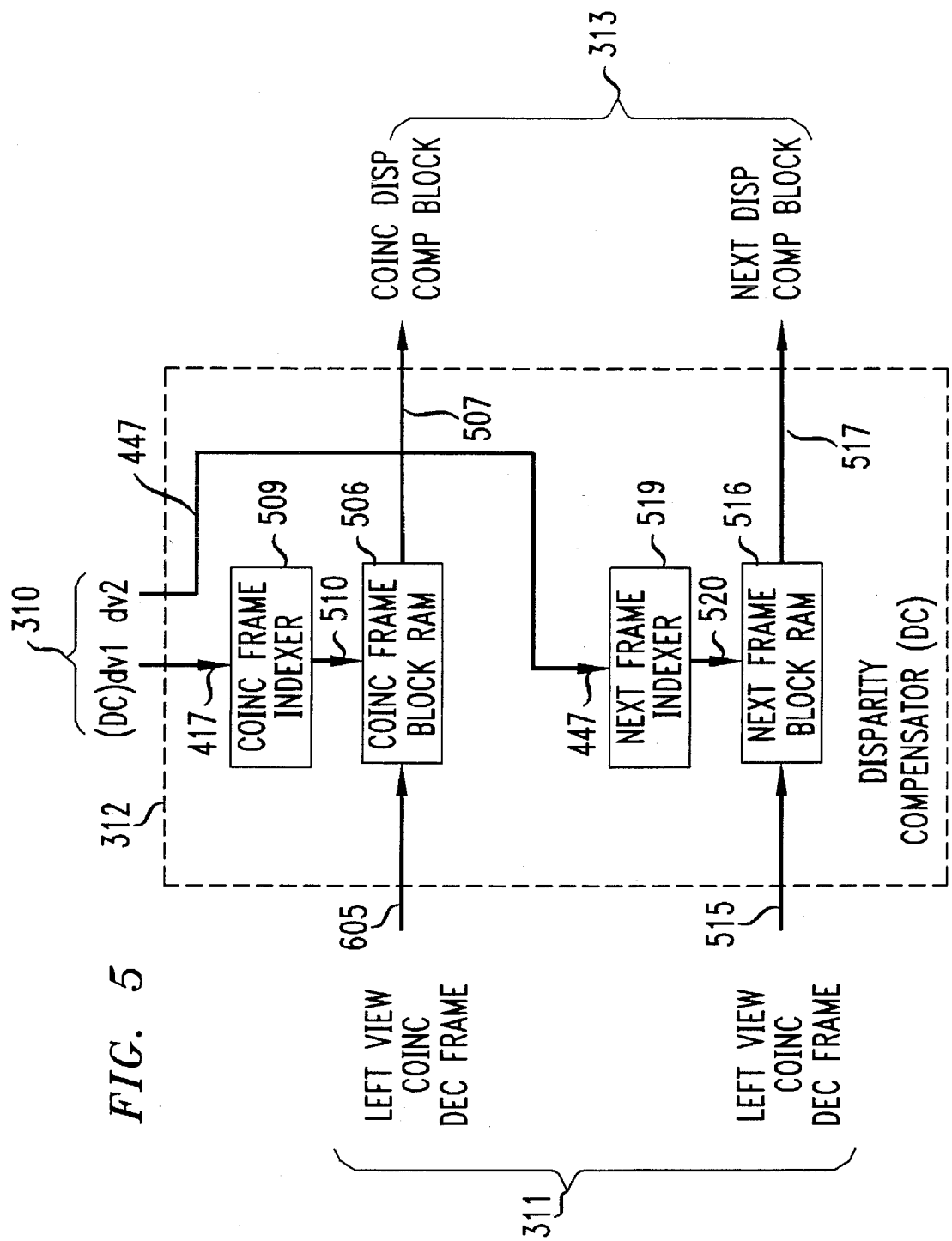
FIG. 5 shows an illustrative disparity compensator for block based coding of stereoscopic video.

FIG. 5 shows details of an example of disparity compensator 312 shown in FIG. 3. This disparity compensator 312 assumes that disparity estimation has been performed according to 307. Two frames, a left view coincident decoded frame and a left view next decoded frame are input on lines 505 and 515 respectively and are used to retrieve two corresponding blocks of pixels that provide the best compensation of disparity with repect to the left view coincident decoded frame and the left view next decoded frame. These two blocks of pixels are referred to as disparity compensated blocks and are output on lines 507 and 517. To retrieve these blocks, disparity vectors and coordinates of current block are used in previous frame indexer 509, and in next frame indexer 5 19 to generate index for disparity prediction blocks which are read into memory RAMs 506 and 516 for temporary storage from input frames on lines 505 and 515. Thus, the mechanism of operation of disparity compensator 312 is similar to that of block motion compensators used in MPEG-1 and nonscalable MPEG-2 video coding.

Figure 6:
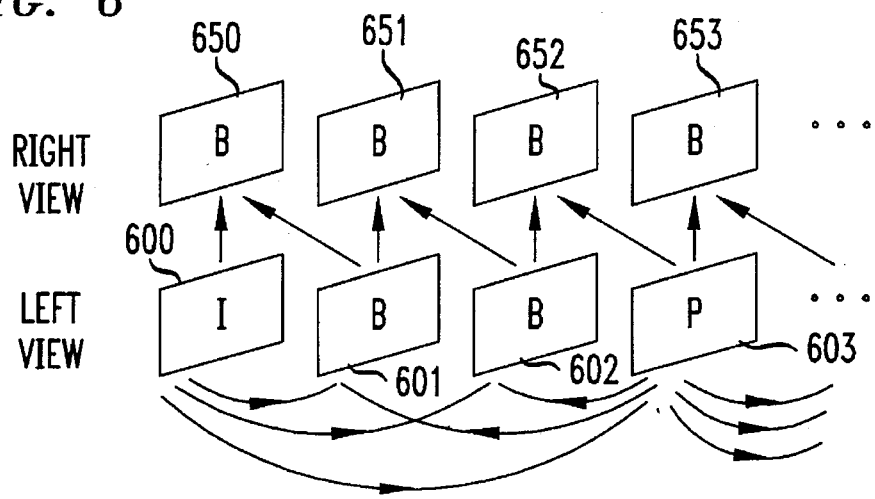
FIG. 6 shows picture structure 1 that uses two disparities compensation for stereoscopic video coding, in accordance with the invention.
Figure 17:
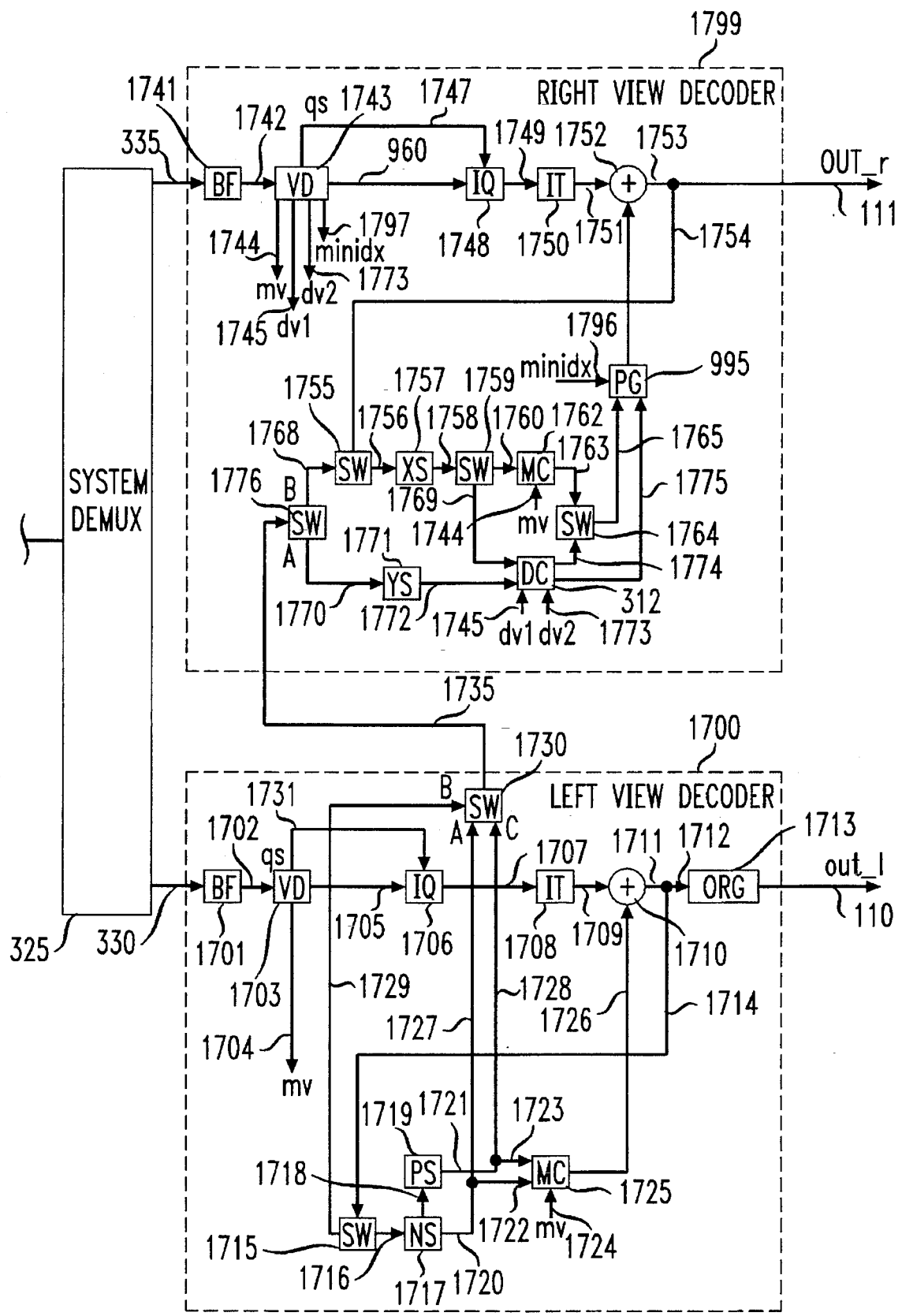
FIG. 17 is a simplified block diagram of a temporal scalability decoder for stereoscopic video, in accordance with the invention.

FIG. 6 shows an exemplary prediction structure for coding stereoscopic video employing the principles of our invention. The left-view consists of a sequence of input frames 600, 601, 602, 603, . . . etc, and are coded with MPEG-1 or nonscalable MPEG-2 video coding. For the purpose of discussion, when using MPEG-2 video coding, it is assumed that frame-pictures are used (although it is recognized that field- pictures could also be used). The left-view is input to an MPEG encoder which uses a constant value of M=3, this value represents prediction distance between a pair of consecutive anchor frames where an anchor frame can be a P- or an I-frame. The number of B-frames between anchor frames is simply derived as M−13. Since B-pictures are noncausal, the order of the input frames is required to be reorganized for coding, since coding order is different from input or display order. For example, in the coding of left-view, MPEG standard coding with M=3 requires that frame 600 be coded by itself first, followed by frame 603 which is coded with respect to decoded frame 600, followed by coding of frames 601 and 602 using decoded frames 600 and 603 and the process repeats. This type of coding is known. The right-view is input to an MPEG-2 temporal scalability-like encoder and consists of asequence of incoming frames 650, 651, 652, ... etc, which are coded with respect to decoded frames of left-view. In this illustrative example, only B-picture coding of right-view frames are utilized, each of which use pairs of decoded frames of left-view as anchors. Although B-pictures are used, no reordering of right-view frames is necessary, as these B-pictures use different semantics as compared to B-pictures used in coding of left-view. The prediction structure employed here involves prediction of each B-picture of right-view using a temporally coincident and a temporally adjacent frame from decoded left-view. Thus, frame 650 is coded using predictions from decoded frames 600 and 601. Note that due to the aforementioned need for picture ordering for coding of left-view, frame 601 is only coded after frame 603 has been coded. The next right-view picture to be coded is 651 and requires decoded frames 601 and 602 from left-view for prediction. Again note that due to frame reordering for coding of left-view, 602 is coded after 601 which is coded after 603. The coding progresses in this manner which results in an initial delay for coding of right-view signal to ensure that appropriate left-view frame is available when needed. Details of an encoder that uses this prediction structure is shown in FIG. 9, while details of a decoder capable of decoding stereoscopic video encoded by encoder of FIG. 9 as well as other structures is shown in FIG. 17.

Figure 7:
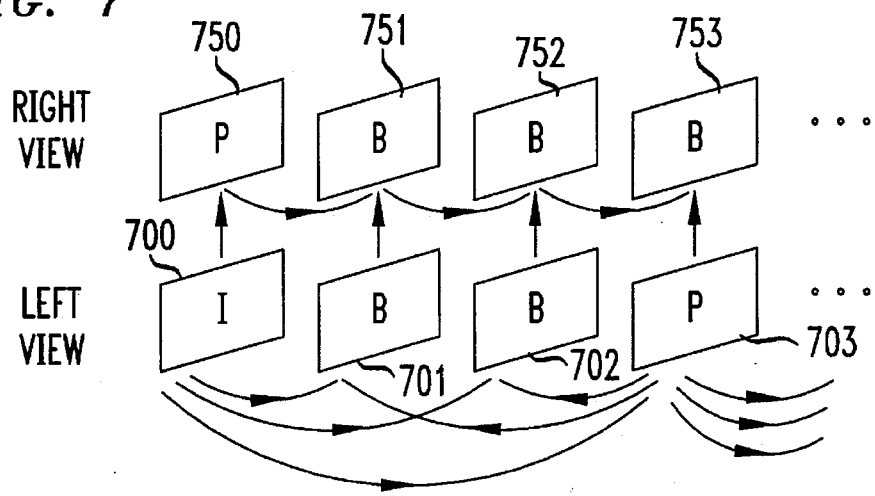
FIG. 7 shows picture structure 2 that uses motion and disparity compensation for stereoscopic video coding, in accordance with the invention.
Figure 10:
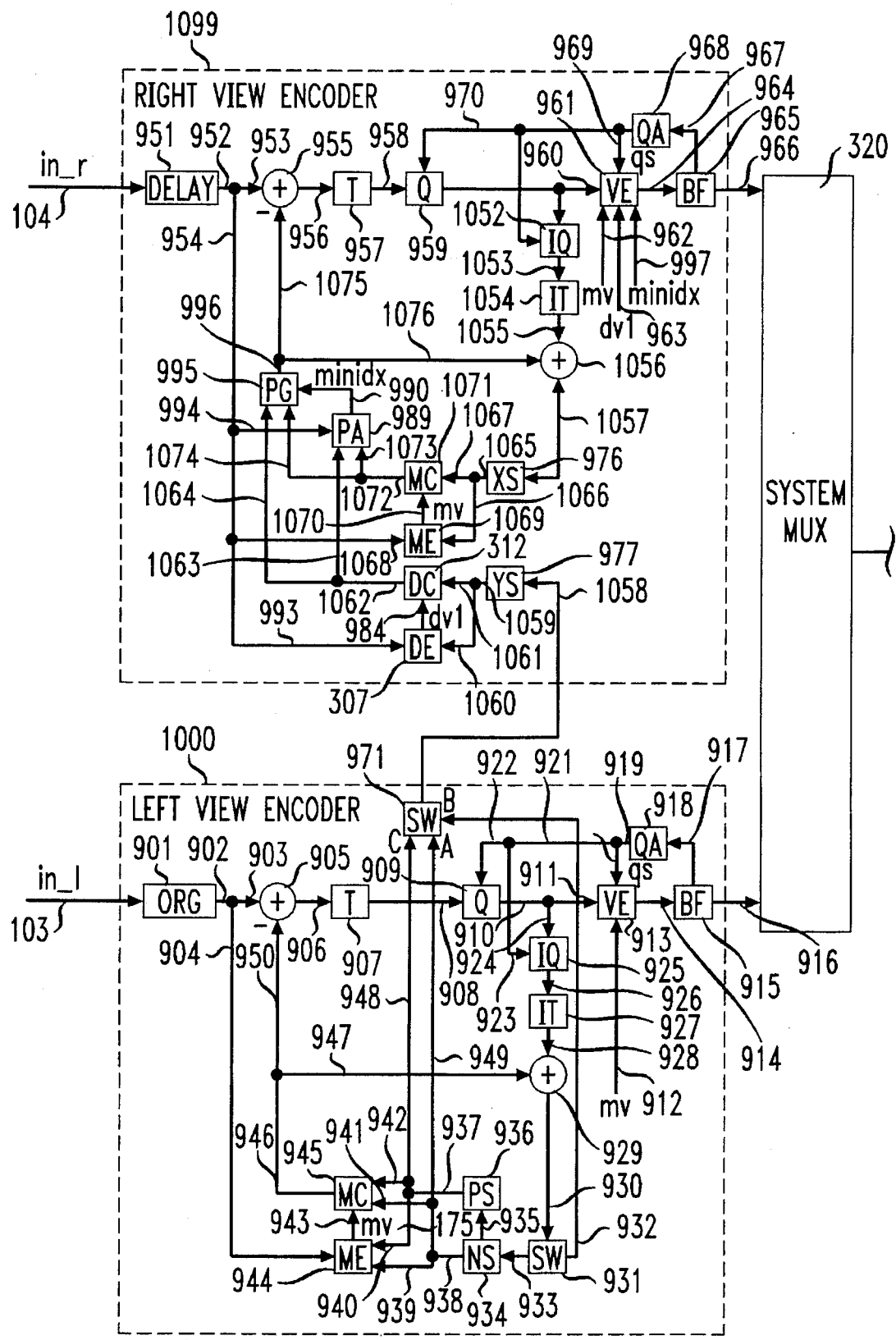
FIG. 10 is a simplified block diagram of a temporal scalability encoder based on picture structure 2 for stereoscopic video, in accordance with the invention.

FIG. 7 shows another example prediction structure for coding of stereoscopic video using the principles of our invention. The left-view consists of asequence of input frames 700, 701, 702, 703, ... etc, and are coded with MPEG-1 or nonscalable MPEG-2 video coding. When using MPEG-2 coding, the discussion may be restricted to frame-pictures only, although the principles of the invention can be easily applied with field- pictures as well. As mentioned earlier, the left-view is input to an MPEG encoder, which is assumed to use B-pictures and in particular, for discussion purposes, a constant distance of M=3 between consecutive anchor frames which are either I- or P-frames separated by 2 B-frames. Further, due to noncausal nature of B-frames, the order of input frames needs to be reorganized for coding. and is different from that of the input or the display order. For example, in coding of left-view, MPEG standard coding with M=3 requires that frame 700 be coded by itself first, followed by frame 703 which is coded with respect to decoded frame 700, followed by frames 701 and 702 using decoded frames 700 and 703, and the process repeats. This type of coding is known. The right-view is input to an MPEG-2 temporal scalability-like encoder and consists of a sequence of incoming frames 750, 751, 752, ... etc, which are coded with respect to decoded left-view frames. With the exception of first frame of right view, which is a P-picture, we employ only B-picture coding of right-view frames, each of which use two predictions, first, a prediction from immediately previous decoded frame of right-view, and second, a prediction from a decoded frame temporally coincident in the left-view. Although we use B-pictures, no reordering of right-view frames is necessary, as these B-pictures use different semantics as compared to B-pictures used in coding of left-view. The prediction structure for right-view is now presented with more details for clarity. Frame 750 is coded as a P-frame and uses decoded frame 700 for prediction. The next right-view frame is 751 and uses decoded right-view frame 750 and decoded left-view frame 701 for prediction. However, due to need for reordering of frames when B-frames are used, decoded frame 701 is only available after frames 700 and 703 are coded, this is the cause of delay in coding of left- an right-views. Next, frame 752 of right-view is coded and uses previously decoded frame 751 and decoded frame 702. Incidentally, frame 702 is coded after coding of frame 701, which is coded after frame 703. The coding progresses in this manner which results in an initial delay for coding of right-view signal to ensure that appropriate left-view frame is available when needed. Details of an encoder that uses this prediction structure are shown in FIG. 10, while details of a decoder capable of decoding stereoscopic video encoded by encoder of FIG. 10 as well as other structures, are shown in FIG. 17.

Figure 8:
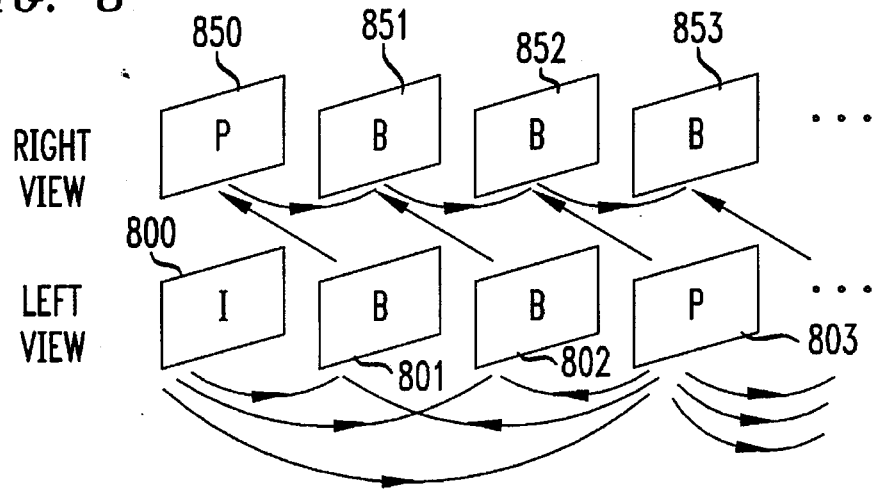
FIG. 8 shows an alternate picture structure 2 that uses motion and disparity compensation for stereoscopic video coding, in accordance with the invention.

FIG. 8 shows yet another example of prediction structure for coding of stereoscopic videousing the principles of our invention. This structure is related to prediction structure in FIG. 7. The left-view consists of asequence of input frames 800, 801, 802, 803, ... etc, and are coded with MPEG-1 or nonscalable MPEG-2 video coding. When using MPEG-2 coding, the present discussion may be restricted to frame-pictures only, although the principles of the invention can be easily applied with field-pictures as well. As mentioned earlier, the left-view is input to an MPEG encoder, which is assumed to use B-pictures and in particular, for discussion purposes, a constant distance of M=3 between consecutive anchor frames which are either I- or P-frames separated by 2 B-frames. Further, due to noncausal nature of B-frames, the order of input frames needs to be reorganized for coding. and is different from that of the input or the display order. For example, in coding of left-view, MPEG standard coding with M=3 requires that frame 800 be coded by itself first, followed by frame 803 which is coded with respect to decoded frame 800, followed by frames 801 and 802 using decoded frames 800 and 803, and the process repeats. This type of coding is known. The right-view is input to an MPEG-2 temporal scalability-like encoder and consists of a sequence of incoming frames 850, 851, 852, ... etc, which are coded with respect to decoded left-view frames. With the exception of first frame of right-view, which is a P-picture, only B-picture coding of right-view frames is employed, each of which use two predictions, first, a prediction flora immediately previous decoded frame of right-view, and second, a prediction from a decoded frame of left-view temporally next to the coincident frame. Although B-pictures are used, no reordering of right-view frames is necessary, as these B-pictures use different semantics as compared to B-pictures used in coding of left-view. The prediction structure for right-view is now presented with more details for clarity. Frame 850 is coded as a P-frame and uses decoded frame 801 for prediction. The next right-view frame is 851 and uses decoded right-view frame 850 and decoded left-view frame 802 for prediction. However, due to need for reordering of frames when B-frames are used, decoded frame 802 is only available after frames 800, 803 and 801 are coded, this is the cause of delay in coding of left-an right-views. Next, frame 852 of right-view is coded and uses previous decoded frame 851 and decoded frame 803. The coding progresses in this manner which results in an initial delay for coding of right-view signal to ensure that appropriate left-view frame is available when needed. This delay is one frame longer then delay by prediction structure of FIG. 7. Details of an encoder that uses this prediction structure are shown in FIG. 10, while details of a decoder capable of decoding stereoscopic video encoded by encoder of FIG. 10 as well as other structures, are shown in FIG. 17.

Figure 9:
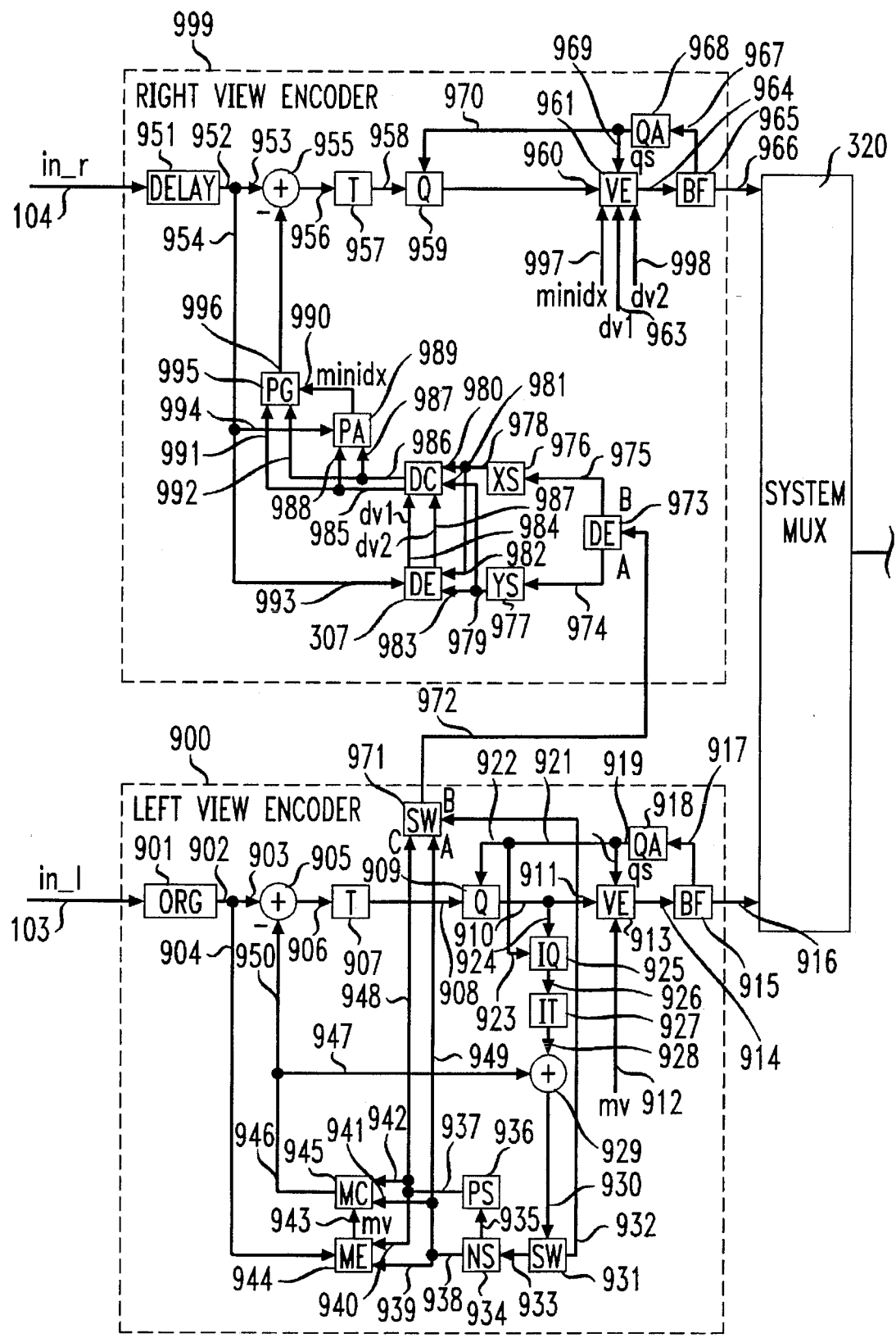
FIG. 9 is a simplified block diagram of a temporal scalability encoder based on picture structure 1 for stereoscopic video, in accordance with the invention.

FIG. 9 shows details of high level encoders shown in 301 and 318 when picture structure of FIG. 6 is employed.

Details of the left-view encoder 900 are presented first. Left-view encoder 900 is similiar, in principle, to an MPEG-1 encoder or an MPEG-2 nonscalable encoder, except for an extra switch and associated circuitry for tapping decoded frames to be used for disparity compensation in right-view encoder, 999. Left-view frames are input on line 103. If encoder 900 uses B-pictures, these left-view frames undergo reordering in organizer 901, and the reordered frames are output on line 902 where they are sent to a differencer 905 on line 903 and also sent to a motion estimator 944 on line 904. If encoder 900 is an MPEG-1 encoder, the motion estimation and compensation are performed on 16×16 blocks of pixels, whereas for nonscalable MPEG-2 encoder, motion estimation and compensation are performed on 16×16 frames/field blocks and 16×8 field blocks. Moreover, MPEG-1 coding involves no motion vectors for I-picture block, one motion vector per P-picture block and two motion vectors per B-picture blocks; whereas in case of MPEG-2, frame, field and dualprime motion can be selected on a block basis and the number of motion vectors varies according to picture type and the mode selected for the block. Motion estimates are computed by block matching in 944 and resuting vectors are provided to the motion compensator 945 over line 943. The frames in frame store PS 936 and next store NS 934 on lines 940 and 939 along with current frame block on line 904 are used to estimate motion vectors. Both frame in frame stores PS 936 and NS 934 are used for computing motion estimates for B-pictures, whereas only frame in frame store PS 936 is used for computing motion estimates for P-pictures. The frames in frame stores PS 939 and NS 934 are also available to motion compensator 945 over lines 942 and 941. Blocks of motion compensated prediction signal on line 950 is differenced from input blocks on line 903 in differencer 905 and output on line 906 where they undergo DCT transformation in DCT 907 using blocks of size 8×8. If nonscalable MPEG-2 encoder is employed in 900, a discrete cosine transform may be performed on 8×8 frame or 8×8 field blocks. The output of DCT 907 are blocks of DCT transform coefficients and are quantized in quantizer 908 according to the quantization step computed in QA 918 based on fullness of buffer 915 and the contents of input block. Quantization step is available on line 919 at the output of QA 918 and is sent to variable length encoder VE 913 to code and include in the bitstream. Motion vectors generated by motion estimator ME 944 are also available at the variable length encoder VE 913 on line 912 to be coded and included in the bitstreams as well. The quantization step is applied via line 922 to quantizer Q 909 which outputs quantized DCT coefficients on line 910 which are also variable length encoded in 913 and included in the bitstream. The output of VE 913 on line 914 is variable rate data and is buffered in BF 915 before being multiplexed with other coded video streams as well as coded audio data in systems multiplexer 320 before transmission or storage on 322. The feedback loop at the encoder generates locally decoded signal which may be used for prediction of future frames. To accomplish this, quantized DCT coefficients at line 910 are routed via line 924 to an inverse quantizer IQ 925 which dequantizes the DCT coefficients using quantization step size which is available on line 923. The output of Iq 925 includes dequantized coefficients which are inverse transformed in IT 927 to regenerate blocks of error pixels (in case of P- and B-pictures and original blocks for I-pictures) to which prediction blocks on line 947 are added in adder 929, resulting in locally reconstructed frame on line 930. This frame, if it is an I- or P-picture, passes through switch 931 and is available on line 938 for storage in next store NS 934 and either remains in NS 934 or gets copied to PS. However, if the decoded frame on line 930 is a B-frame, (since B-frames in the left- view encoder are not used for prediction of other type of frames) it is sent via switch 931 to output line 932, which itself forms the B input to switch 971. The two other inputs to switch 971 are lines 948 and 949 and are connected to output of frame stores PS and NS. Thus switch 971 allows selection between 3 inputs, line 932, line 949, line 948 and route one of these inputs to the output line 972, which feeds back to the right-view encoder, 999. The right-view frames are input on line 941 and since they use decoded left-view frames for prediction they need to be delayed in 951 to align them such that when a right view frame is to be encoded, the temporally coincident decoded left-view frame and the next decoded left-view frame are available for prediction. This is accomplished by storing the aforementioned locally decoded left-view frames when they are generated by left-view encoder and passed on through switch 971 on line 972 to switch 973 which stores them either via line 975 to frame store XS 976 or via line 974 to frame store YS 977. The frame store XS 976 and frame store YS 977 further feeds disparity estimator DE 307 via lines 405 and 435, respectively, and disparity compensator 312 via lines 505 and 515. The disparity estimator also takes in current right-view block on line 404 and searches for best prediction blocks in frame stores XS 976 and YS 977. Corresponding disparity vectors that yield the best disparity prediction are output on lines 417 and 447 and are used by disparity compensator DC 312. These disparity vectors are also sent on lines 983 and 998 to variable length encoder VE 961 for encoding and multiplexing the necessary disparity vector/s into the bitstream. The disparity compensator DC, 312, takes disparity vectors on lines 417 and 447, and decoded left-view coincident frame and left-view next frames on lines 505 and 515 to generate disparity compensated prediction blocks and outputs them on lines 507 and 517. A prediction analyzer PA 989 examines the disparity compensated prediction blocks on its input lines 987 and 988, and the input current block of right-view on line 994 and based on minimum absolute error or mean square error criteria, determines and outputs an index to the best prediction using these blocks, on line 990. This index is input to the prediction generator PG 995 which also takes the two disparity prediction blocks at input lines 991 and 992. The disparity compensated prediction is output on line 996 and forms an input to the differencer 955, at whose input, 953, are blocks of current right-view frames. The prediction error signal on line 956 is input to DCT transform T 957 and the transformed blocks on line 958 are quantized by quantizer Q 959 and output on line 960 which feeds the variable length encoder VE 961. The quantizer Q 959 uses a quantization step size generated by quantization adapter QA 968 based on fullness of buffer BF 965 and spatial content of each block. The fullness of buffer is supplied to QA 968 over line 967 and the QA 968, in turn, generates the quantization step size and provides it to quantizer Q 959 on line 970 and to variable length encoder VE 961 on line 969 for encoding and multiplexing into the bitstream. The variable length bitstream generated by 961 is output on line 964 to buffer BF 965. The various video streams and audio streams are multiplexed in systems multiplexer, 320 before being output on channel 322. It is worth noting that the part of the circuit which generates right-view locally decoded frames is not shown due to two reasons: first, it is not needed as no temporal prediction occurs here using past decoded frames; and second, for simplicity. However, if more than two layers are employed, for example on coding of multiview scenes using this technique, it may be necessary to include a feedback loop like the one shown in left view encoder and is composed of path similar to line 924 to 930 consisting of an inverse quantizer IQ, an inverse transform T, and an adder. With respect to the prediction analyzer PA 989 and the prediction generator PG 990, there are several possibilities for the type of operations that can be performed. Each method may result in a different tradeoff overhead, performance, simplicity and compatibility. Several examples of such PAs and PGs in the following FIGS. 11 through 16.

FIG. 10 shows details of high level encoders shown in 301 and 318, when picture structure of FIG. 7 or FIG. 8 is employed. These encoders are called the left-view encoder 1000 and the right-view encoder 1099. The function of the left-view encoder is practically identical to the left-view encoder, 900, just described. This encoder can be an MPEG-1 or a nonscalable MPEG-2 encoder, with addition of a mechanism of switching that allows routing of decoded frames to the right-view encoder at appropriate times. Left-view frames are input on line 103 and if encoder 1000 uses B-pictures, undergo reordering in organizer, 901, and the reordered frames are output on line 902 where they are sent to a differencer 905 on line 903 and also sent to a motion estimator, 944, on line 904. If encoder, 900, is an MPEG-1 encoder, the motion estimation and compensation are performed on 16×16 blocks of pixels, whereas for nonscalable MPEG-2 encoder, motion estimation and compensation are performed on 16×16 frames/field blocks and 16×8 field blocks. Moreover, MPEG-1 coding involves no motion vetors for I-picture block, one motion vector per P-picture block and two motion vectors per B-picture blocks; whereas in case of MPEG-2, frame, field and dualprime motion can be selected on a block basis and the number of motion vectors varies according to picture type and the mode selected for the block. Anyhow, motion estimates are computed by block matching in 944 and resuting vectors are provided to the motion compensator 945 over line 943. The frames in frame store PS 936 and next store NS 934 on lines 940 and 939 along with current frame block on line 904 are used to estimate motion vectors. Both frame in frame stores PS, 936, and NS, 934, are used for computing motion estimates for B-pictures, whereas only frame in frame store PS 936 is used for computing motion estimates for P-pictures. The frames in frame stores PS and NS are also available to motion compensator 945 over lines 942 and 941. Blocks of motion compensated prediction signal on line 950 is differenced from input blocks on line 903 in differencer, 905, and output on line 906 where they undergo DCT transformation in 907 using blocks of size 8×8. If nonscalable MPEG-2 encoder is employed in 1000, DCT may be performed on 8×8 frame or 8×8 field blocks. The output of 907 are blocks of DCT transform coefficients and are quantized in quantizer 908 according to the quantization step computed in QA 918 based on fullness of buffer, 915 and contents of input block. Quantization step is available on line 919 at the output of QA 918 and is sent to variable length encoder V, 913 to code and include in the bitstream. Motion vector/s generated by motion estimator ME, 944, are also available at the variable length encoder VE, 913, on line 912 to be coded and included in the bitstreams as well. The quantization step is applied via line 922 to quantizer Q 909 which outputs quantized DCT coefficients on line 910 and are also variable length encoded in 913 and included in the bitstream. The output of VE, 913 on line 914 is variable rate data and is buffered in BF 915 before being multiplexedwith other coded video sterams as well as coded audio data in systems multiplexer 320 before transmission or storage on 322. The feedback loop at the encoder generates locally decoded signal which may be used for prediction of future frames. To accomplish this, quantized DCT coefficients at line 910 are routed via line 924 to an inverse quantizer IQ, 925 which dequantizes the DCT coefficients using quantization step size also available on line 923. The output of Iq 925 is dequantized coefficients which are inverse transformed IT in 927 to regenerate blocks of error pixels (in case of P- and B-pictures and original blocks for I-pictures) to which prediction blocks on line 947 are added in adder 929, resulting in locally reconstructed frame on line 930. This frame, if it is an I- or P-picture, passes through switch 931 and is available on line 938 for storage in next store NS, 934 and either remains in NS or gets copied to PS. However, if the decoded frame on line 930 is a B-frame, since, B-frames in left view encoder are not used for prediction of other type of frames, it is sent via switch 931 to output line 932, which itself forms the B input to switch 971. The two other inputs to switch 971 are lines 948 and 949 and are connected to output of frame stores PS and NS. Thus switch 971 allows selection between 3 inputs, line 932, line 949, line 948. The output of the switch 971 appears on line 1058. If the prediction structure of FIG. 7 is selected, the contents of previous frame store PS, 936, and B-pictures appearing on line 932 are routed via switch 971 to line 1058. However, if prediction structure of FIG. 8 is selected, the contents of next frame store NS, 934, and B-pictures appearing on line 932 are routed via switch 971 to line 1058. In the operation of right view encoder, 1099, we assume that prediction structure of FIG. 7 is being used, although, to use the prediction structure of FIG. 8, very minimal changes are necessary. The right-view signal is input on line 104 and is delayed in 951 so as to have decoded left-view frames available for prediction of right-view frames. The delayed right-view signal is input to differencer 955 via line 953, at the other input to differencer is the prediction signal on line 1075. The prediction error signal on line 956 is DCT transformed in T 957 and the block of transform coefficients is sent on line 958 to quantizer Q 959. The quantized transform coefficients are sent on line 960 to be variable length encoded by VE 961. The output of VE 961 at a variable datarate goes into a buffer BF 965 via line 964 and the output of BF goes into systems multplexer 320 where the right-view and the left-view bitstreams are multiplexed along with audio bitstreams. The fullness of buffer BF 965 and contents of input block are used to generate quantization step which is input to Q on line 970 and to variable length encoder VE on line 969. The quantized coefficients are sent to inverse quantizer IQ 1052 which is also supplied with quantizer step size on line 1051. The resulting dequantized coefficients are sent via line 1053 to inverse transform IT 1054 to which is added the prediction signal in adder 1056 via line 1076. The local decoded signal at the encoder is available on line 1057. This signal is stored in frame store XS 976 which feeds the motion estimator ME 1069 which also receives the current input block of right view signal on line 1068. Motion vectors are generated by ME 1069 and output on line 1070 to motion compensator 1071 which uses contents of frame store XS 976 via line 1067. The motion compensated prediction signal is output on line 1072. The motion vectors are also fed to the variable length encoder VE via line 962 for coding and multiplexing into the bitstream. The output of switch 971 is fed via line 1058 to a frame store YS 977. The switch 971 directs left-layer decoded frames that are temporally coincident with right-view frames for disparity compensated prediction. The output of frame store YS 977 is routed through switch 1060 either to line 1061 or to line 1062, depending on whether the prediction structure of FIG. 7 or of FIG. 8 is used. Since, only one disparity compensted prediction is used, only one frame store YS feeds the disparity estimator DE 307. Assuming prediction structure of FIG. 7, the DE 307 compares the input current right-view block on line 404 with frame stored in YS, available on line 405, this disconnects line 455. The disparity vector dv1 is generated by disparity estimator on line 417 and input to disparity compensator DC 312. Disparity vector dv2 is not used. When prediction structure of FIG. 8 is used, the line 455 at the input to disparity estimator DE 307 is active, while line 405 is disconnected. In this case, disparity vector dv2 is generated on line 447, while disparity vector dv1 is inactive. In any case, one of the two outputs 507 or 517 of disparity compensator DC, 312, is active and selected via switch SW, 1063. The output of the switch SW, 1063, is disparity compensated prediction on line 1064 and is fed to prediction analyzer PA 989, on line 988. The other input of PA, 989,is fed by motion compensated prediction on line 1072 and is applied via line 987. The prediction analyzer PA 989 analyzes the combination of motion compensated prediction and disparity compensated prediction that may result in smallest prediction error and generates minindx signal on line 990 to indicate the best combination. The prediction analyzer PA 989 generates the prediction errors by comparing the input predictions on lines 987 and 988 with current right view block on line 994. The motion compensated prediction MC 1071 on line 991 and disparity compensated prediction DC 992 are fed to prediction generator PG 995 which is also supplied with minindx signal on line 990, and generates a combined prediction signal on line 996. This signal is applied to the adder 1056 via line 1076 and also to the differencer 955 via line 1075. This completes the feedback loop for the right-view encoder, 1099. There are several possibilities for prediction analyzers PA 989 and for corresponding prediction generators PG 995; the best choice depends on performance, simplicity and compatibility. FIG. 11 through FIG. 16 show examples of prediction analyzers PA 989, and prediction generators PG 995.

Figure 11:
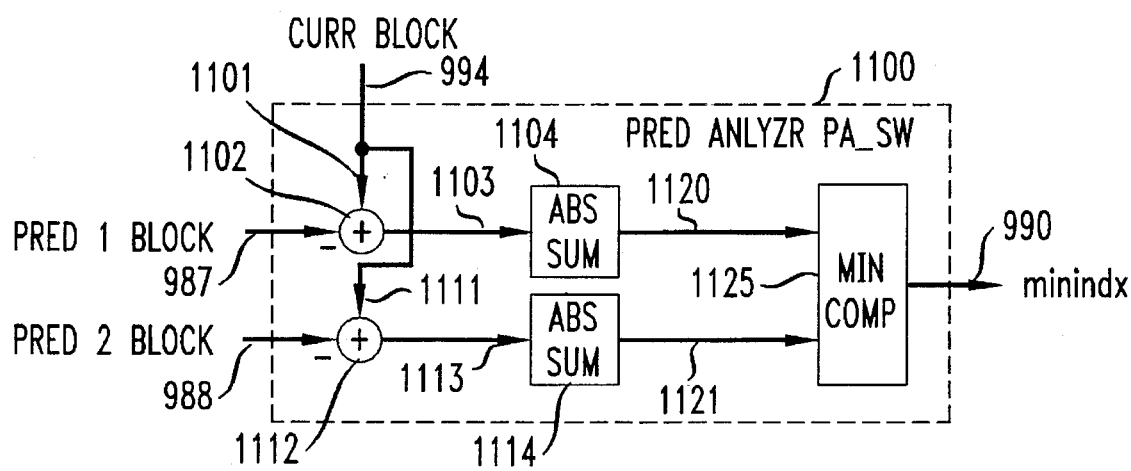
FIG. 11 is a simplified block diagram of a prediction analyzer with switched prediction, arranged in accordance with the invention.

FIG. 11 shows an example of prediction analyzer PA 989. This type of prediction analyzer is referred to as PA_SW 1100. The current block of right-view, for which prediction is being sought, is input on line 994. The two prediction blocks, either, both disparity based predictions if prediction structure of FIG. 6 is used in conjunction with encoder of FIG. 9, or one motion compensated prediction and one disparity compensated prediction if predicction structure of FIG. 7 or FIG. 8 is used in conjunction with encoder of FIG. 10, are input on lines 987 and 988. The differencer 1102 computes the difference between signals on its input lines 1101 and 987 and outputs the prediction error on line 1103. Simultaneously, differencer 1112 computes the difference between signals on its input lines 1111 and 988 and outputs the prediction error on line 1113. The lines 1103 and 1113 feed sum of absolute value operators, 1104 and 1114 respectively, whose outputs 1120 and 1121 are compared in a minimum comparator 1125 to determine the prediction that results in the least prediction error. The output of the minimum comparator 1125 is a minindex signal on line 990, which indicates which of the two inputs provides the least prediction error. Thus the prediction analyzer PA_SW, allows analysis of the two input predictions, whether they are two disparity compensated prediction blocks or one motion and one disparity compensated prediction blocks, and can be used with right-view encoders, 999 and 1099 of FIGS. 9 and 10. In each case, minindex on line 990, simply identifies the input prediction block that gives the best prediction.

Figure 12:
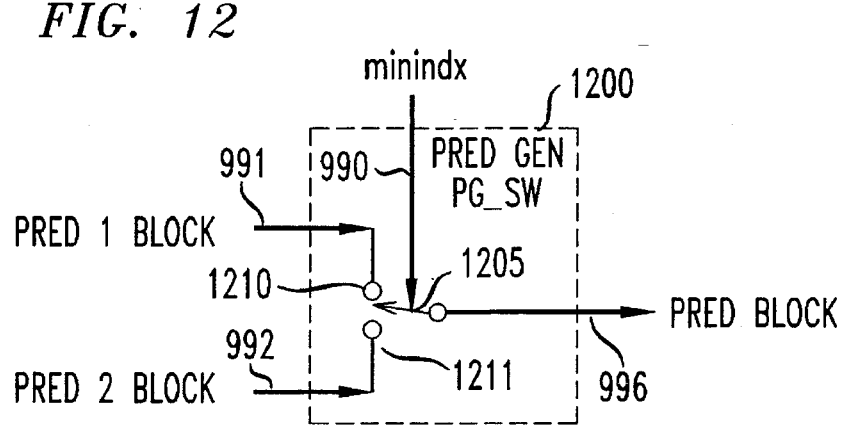
FIG. 12 is a simplified block diagram of a prediction generator with switched prediction, arranged in accordance with the invention.

FIG. 12 shows an example of prediction generator PG 995. This type of prediction generator is referred to as PG_SW 1200, and corresponds to the prediction analyzer PA_SW 1100. This prediction generator PG_SW, 1200, simply operates as a switch 1205, allowing one of the two predictions at the input lines 991 and 992 to be selected to be output on line 996 under the control of minindex signal, 990, which is generated by the prediction analyzer PA_SW 1100, as described earlier. The two predictions at input lines 991 and 992 may be both disparity compensated predictions, as in case of prediction structure of FIG. 6 or one motion compensated and one disparity compensated predictions for the prediction structures of FIG. 7 or FIG. 8.

Figure 13:
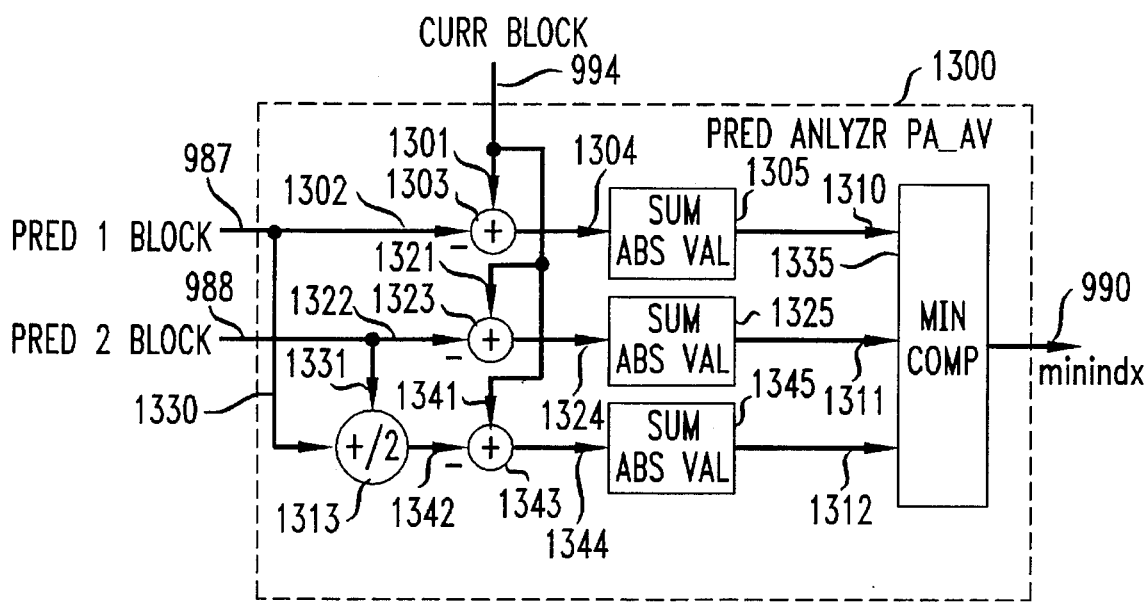
FIG. 13 is a simplified block diagram of a prediction analyzer with switched and averaged prediction, in accordance with the invention.

FIG. 13 shows another example of prediction analyzer PA 989. This type of prediction analyzer is referred to as PA_AV 1300. The current block of right-view, for which prediction is being sought, is input on line 994. The two prediction blocks, either, both disparity based predictions if prediction structure of FIG. 6 is used in conjunction with encoder of FIG. 9, or one motion compensated prediction and one disparity compensated prediction if predicction structure of FIG. 7 or FIG. 8 is used in conjunction with encoder of FIG. 10, are input on lines 987 and 988. In addition to using two predictions as in FIG. 11, a third mode of average of the two predictions is allowed by PA_AV 1300. The average is computed in 1313, which takes two inputs on line 1330 and 1331 and are same as predictions on input lines 987 and 988. The output of the averager on line 1342 goes to a differencer 1343, at whose other input 1341, is the current block of right-view. Simultaneously, the two input predictions on lines 987 and 988 are also applied to differencers, 1303 and 1323, via lines 1302 and 1322; the other input to the differencers 1303 and 1323 is the current block of right-view input, 994, via lines 1301 and 1321 respectively. The output of the three differencers, 1303, 1323 and 1343, is the prediction error blocks on lines 1304, 1324 and 1344, which are further input to absolute value sum computers, 1305, 1325, and 1345 respectively. The corresponding outputs on lines 1310, 1311, and 1312 are fed to a minimum computer 1355 which determines the minimum of the three absolute prediction error blocks and outputs a minindex on line 990 identifying the best prediction block. Thus the prediction analyzer PA_AV, allows analysis of the two input predictions, whether they are two disparity compensated prediction blocks or one motion and one disparity compensated prediction blocks and can be used with right-view encoders, 999 and 1099 of FIGS. 9 and 10. In each case, the minindex signal on line 990, simply identifies the input prediction block that gives the best prediction.

Figure 14:
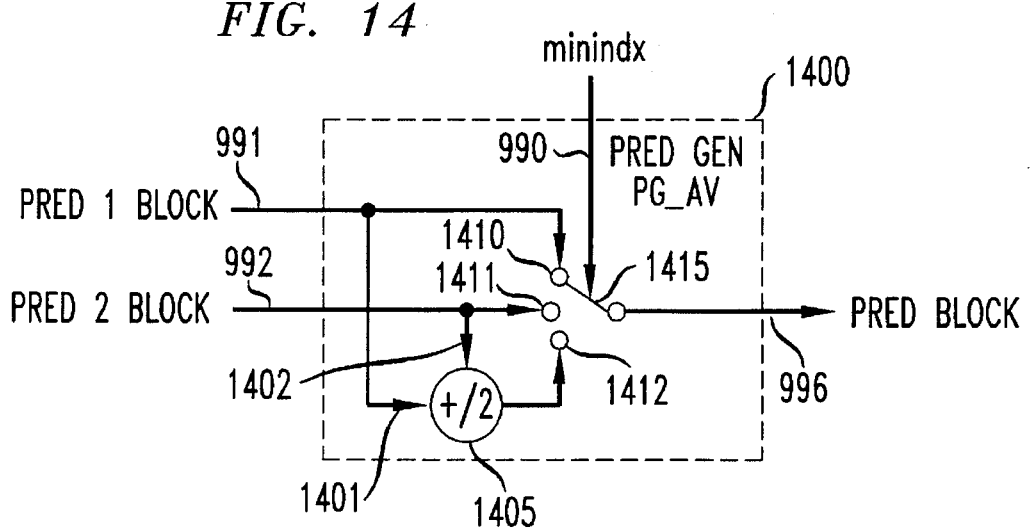
FIG. 14 is a simplified block diagram of a prediction generator with switched and averaged prediction, in accordance with the invention.

FIG. 14 shows another example of prediction generator PG 995. This type of prediction generator is referred to as PG_AV 1400, and corresponds to the prediction analyzer PA_AV, 1300. This prediction generator PG_AV 1400, simply operates as a switch, 1410, allowing one of the three predictions at the input lines 1410, 1411, and 1412 to be selected to be output on line 996 under the control of minindex signal 990, which is generated by the prediction analyzer PA_AV 1300, as described earlier. The two predictions at input lines 991 and 992 may be both disparity compensated predictions, as in case of prediction structure of FIG. 6 or one motion compensated and one disparity compensated predictions for the prediction structures of FIG. 7 or FIG. 8. These two predictions are applied on lines 1410 and 1411, and an average of the two predictions is computed using input on lines 1401 and 1402 in 1405 and output on line 1412, which forms the third input to switch 1415.

Figure 15:
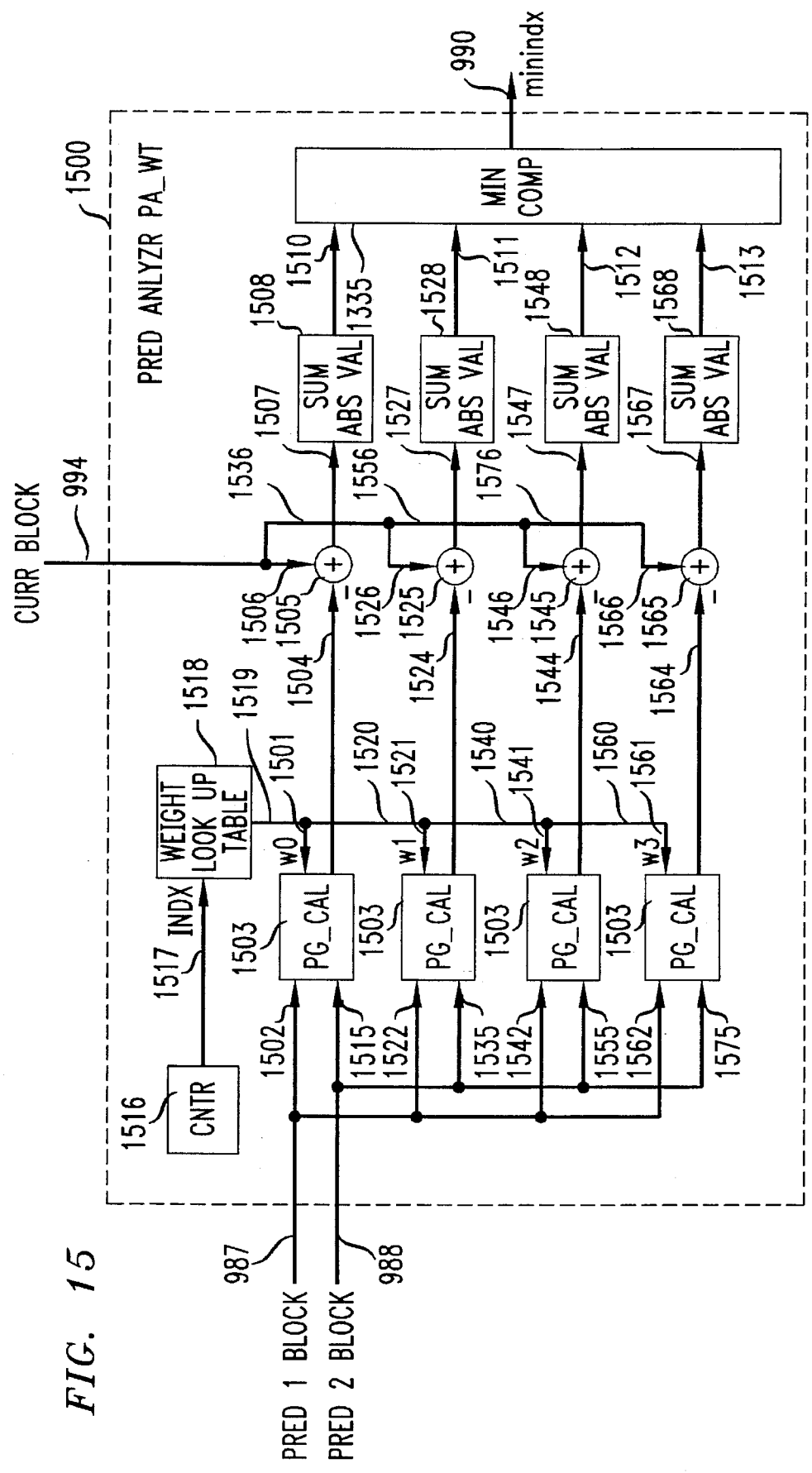
FIG. 15 is a simplified block diagram of a prediction analyzer with weighted prediction, in accordance with the invention.

FIG. 15 shows another example of prediction analyzer PA 989. This type of prediction analyzer is referred to as PA_WT 1500. The current block of right-view, for which prediction is being sought, is input on line 994. The two prediction blocks are input on lines 987 and 988. These predictions can be both disparity compensated predictions, as in case of prediction structure of FIG. 6 or one motion compensated and one disparity compensated predictions for the prediction structures of FIG. 7 or FIG. 8. The two predictions are applied via lines 1501 and 1515 to prediction generation calculator PG_CAL 1503 whose output on line 1504 is input to a differencer 1505, on whose other input is the current right-view block, applied on line 1506. PG_CAL 1503 also takes as input a weight o obtained from weight look up table, 1518, via line 1501. A counter, 1516, presents a count on line 1517 which is used as an index to look up a weight from weight table 1518 and output it on bus 1519. It is assumed that the counter 1516 increments a total of four times, each time outputting an index on line 1517 which is used to read a weight from loop up table 1518 and output on bus 1519. Corresponding to four weights in the weight table, it is assumed that four parallel structures for computation of PG_CAL and the corresponding prediction differences. One such structure composed of PG_CAL, 1503, output on line 1504, differencer, 1505, and its output on line 1507 was previously discussed above. Three other such parallel structures, the first one composed of PG_CAL 1523, output on line 1524, differencer, 1525, and its output on line 1527, the second one composed of PG_CAL, 1543, output on line 1544, differencer, 1545, and its output on line 1547, the third one composed of PG_CAL, 1563, output on line 1564, differencer, 1565, and its output on line 1567. The four prediction error signals on lines 1507, 1527 and 1547 and 1567 are sent to corresponding sum of absolute value calculators, 1508, 1528, 1548 and 1568, whose outputs 1510, 1511, 1512 and 1513 are compared in minimum computer, 1585. The output of 1585, is the minndx on line 990, simply identifies the selected weight combination which when applied on input prediction blocks gives the best prediction.

Figure 16:
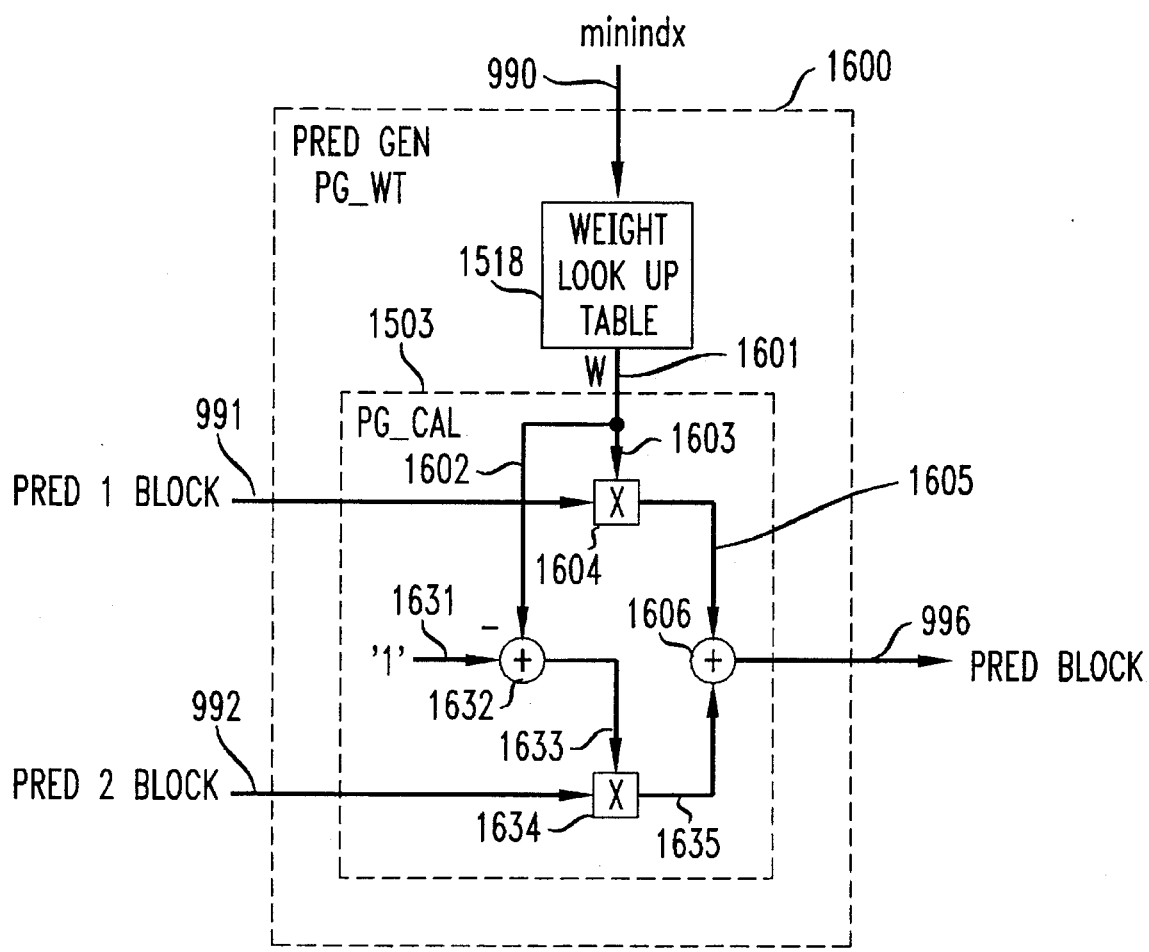
FIG. 16 is a simplified block diagram of a prediction generator with weighted prediction, in accordance with the invention.

FIG. 16 shows another example of prediction generator PG, 995. This type of prediction generator is referred to as PG_WT, 1600, and corresponds to the prediction analyzer PA_WT, 1500. This prediction generator PG_WT, 1600, operates as a weighter, which depending on the value of minindx on line 990, reads a corresponding value from weight look up table, 1650, and outputs it on line 1601. This weight is input on line 1603 to a multiplier, 1604, at whose other input on line 991 is a prediction block. This weight, after subtraction from one is used for multiplying in a multiplier, 1634, a second prediction block input on line 992. The output of the two multipliers, 1604 and 1634 on lines 1605 and 1635 is summed in adder 1606 resulting in weighted combination of two input prediction blocks. The combined weighted block is output on line 996. The two predictions at input lines 991 and 992 may be both disparity compensated predictions, as in case of prediction structure of FIG. 6 or one motion compensated and one disparity compensated predictions for the prediction structures of FIG. 7 or FIG. 8.

FIG. 17 shows the decoder for stereoscopic video corresponding to encoders of FIGS. 9 and 10. It operates, in principle, in a similar fashion as a two layer temporal scalability decoder in accordance with the the MPEG-2 standard, where the base-layer can be decoded by itself while the enhancement-layer uses decoded base-layer for prediction. There are however some semantic differences specific to decoding stereoscopic video coded by encoders of FIG. 9 and FIG. 10. Since the MPEG standards only specifies the bitstream syntax and hence the decoder, a single decoder has to be able to decode bitstreams generated by various encoders with different picture organizations. The left-view decoder is either MPEG-1 or nonscalable MPEG-2 decoder, with the exception of extra switching mechanism for redirecting frames to right-view decoder for use in disparity estimation.

The operation of the left-view and right-view decoders is described below. System demultplexor 325 demultiplexes incoming bitstream and forwards an appropriate portion of the bitstream to left-view decoder 1700 and the right-view decoder 1799 on lines 330 and 335 respectively. The portion of bitstream input to left-view decoder is sent to buffer BF, 1701, before being forwarded to variable length decoder VD 1703. The VD 1703 decodes incoming data and outputs decoded DCT coefficients on line 1705, quantization step qs on line 1701, and motion vectors mv on line 1704. The DCT coefficients are inverse quantized IQ in 1706 and fed over line 1707 to inverse transform IT 1708 to generate reconstructed blocks of prediction error signal to which the prediction signal is summed in adder 1710. The reconstructed frames are reordered in organizer ORG 1713 which works in an identical fashion as ORG 901 at the encoder (i.e., it reorders the frames when B-pctures are present to generate correct display order). The output of the left-view encoder is available on line 110. To complete the prediction loop, the output of the adder 1710 is fed back to a switch 1715. When it corresponds to a decoded I-or P-picture, it is stored in frame store NS 1717, via line 1716, just before next P-or I-picture arrives, and the contents of NS 1717 are shifted to previous frame store PS, 1719, and the decoded P-or I-frame is stored in PS 1719. The contents of PS 1719 and NS 1717 are available over lines 1722 and 1723 to compute motion compensation MC 1725 using decoded motion vectors mv on lines 1724. The motion compensated prediction is thus output on line 1726. When B-frames are decoded, since they are never used for prediction in MPEG-1 or nonscalable MPEG-2, the switch 1715 allows them to be passed on line 1729 to switch 1730 at the 'B' input. At other inputs of the switch 1730, the previous frame as well as next-frame are available via lines 1728 and 1727. This switch can route either of the three inputs to the outputs 1735 which is provided to right-view decoder for use in generating disparity based prediction. For example, when M=3 MPEG coding is used by left-view encoder, the resulting bitstream when decoded, an I-picture is decoded and placed in frame store NS 1717, then comes a P-picture which is decoded, and just before it is sent to frame store NS 1717, the picture in frame store NS 1717, is shifted to frame store PS, 1719. Next the B-pictures are decoded and since they are not used for prediction of any other picture of left-view, they are not input to frame store but is routed via switch 1715 to line 1729 and further via line 1729 to switch 1730. The other two inputs to switch 1730 are line 1728 and line 1727. The output of the switch SW 1730 is on line 1735 and routed to switch 1767. If prediction structure of FIG. 6 is used, all the three inputs of switch 1730 can be routed to via line 1735 to switch 1757. If prediction structure of FIG. 7 or FIG. 8 is used, then one of the two lines 1721 or 1728 is active along with line 1729 which carries the decoded B-pictures.

The operation of the right-view decoder is discussed next. The bitstream to be decoded by the right-view decoder is sent by systems demultiplexer 325 on line 335 to buffer BF, 1741, and through line 1742 to variable length decoder VD 1743 which decodes and outputs quantization step size qs on line 1747, motion vectors mv on line 1744, prediction combination selection information minindx on line 1797, disparity vectors, dv1 and dv2 on lines 1745 and 1773, and quantized DCT coefficients on line 1746. The quantized DCT coefficients on line 1746 feed an inverse quantizer IQ, 1052, which uses the quantization step qs on line 1747 to dequantize blocks of DCT coefficients and sends them on line 1749 to inverse DCT transform IT, 1054, which outputs blocks of pixels representing the prediction error signal on line 1751. The decoded prediction error signal on line 1751 is sent to an adder 1752, where a prediction on line 1766 is added to it generating the decoded right view-frames on line 1753, which are output on line 111. If the prediction structure of FIG. 6 is employed, the prediction signal on line 1768 is generated by use of disparity compensation only and the decoded right-view frames are not used for prediction. However, if prediction structure of FIG. 7 or FIG. 8 is employed, the prediction signal on line 1740 is generated by use of motion compensated prediction as well as disparity compensated prediction. First, assuming prediction structure of FIG. 6, the left-view layer decoded frame temporally coincident with right-view frame on line 1735, passes through a switch SW 1767 to line 1740 and further through another switch SW 1755 to line 1756 which leads it to frame store XS 976. Next, the left-few decoded frame, temporally next to the right-view frame to be coded is available on line 1735 and passes through switch SW 1767 to line 1768, and ends up in frame store YS 977. At this point, both the decoded left-view reference frames needed for generating the disparity compensated prediction are available. The contents of frame store 976 is now made available to disparity compensator DC, 312, through input lines 1758, switch 1759 and to line 1769. The content of frame store 977 is also made available to DC, 312, through line 1770. Furthermore, disparity vectors dv1 on line 1745 and disparity vectors dv2 on line 1773 are made available to DC 312, which generates two disparity compensated predictions and outputs them on lines 1772 and 1774. The first disparity prediction passes through switch 1775 and to line 1765. The prediction generator PG takes two prediction inputs on lines 1765 and 1773, as well as, a minindx signal on line 1797 to generate a combined prediction signal on line 1766.

This completes the decoding process corresponding to prediction structure of FIG. 6, in which the decoded frames are typically B-frames only. Next, the deoding process for prediction structure of FIG. 7 is described including discussion related to how it can be modified for decoding corresponding to prediction structure of FIG. 8.

The prediction structures of FIGS. 7 and 8 use one motion compensated prediction and one disparity compensated prediction, with the main difference between the prediction structure being whether disparity compensated prediction dv1 or dv2 is employed. It is assumed that a prediction structure of FIG. 7 is employed to perform coding according to FIG. 10 and a resulting in a bistream thus needs to be decoded. The left-view layer decoded frame temporally coincident with right-view frame on line 1735, passes through a switch SW 1767, to line 1768 and further to frame store YS 977. If the frame of right-view being decoded is the first frame, it simply uses frame in frame store YS, for generating the prediction as the right view- frame being decoded is a P-frame. However, the remaining frames to be decoded for right-view take two prediction references, except for cases where scene changes may occur and only P-frames may be used. For the general case of B-frames, the previous decoded frame from right-view is already saved before coding of present right-view frame start. The previous frame was generated at output line 1753 and diverted through line 1754 and switch 1755 to line 1756 which feeds the frame store XS, 976. At this time the two reference frames, used for prediction with prediction structure of FIG. 7 are available in frame stores 976 and 977. The contents of rame store XS 976 is sent via line 1758 and switch 1759 to motion compensator MC, 1071 and outputs a motion compensated prediction signal on line 1763, which goes through switch SW, 1775 and on to line 1765 which forms input to prediction generator PG, 995. Likewise, the decoded left-view coincident frame from frame store XS 977 is output on line 1770 which forms input to disparity compensator DC 312 whose other input 1769 is disconnected at this time, and generates using dv1 only a single disparity compensated prediction on line 1774 which forms the other input to prediction generator PG 995. The minindx signal on line 1797 is also provided to 995 and is used to generate a single combined prediction on line 1766. This concludes the feedback loop for decoding of right-view signal when prediction structure of FIG. 7 is used for encoding. The decoding of right-view signal when prediction structure of FIG. 8 is used in encoding is quite similar, the only difference is that instead of storing decoded left-view temporally coincident frame in frame store YS 977, the decoded left-view next to coincident frame is stored in frame store YS, and that disparity vector dv2 is active and used for generating disparity compensated prediction in DC 312.

It will be understood that the particular techniques described above are only illustrative of the principles of the present invention, and that various modifications could be made by those skilled in the art without departing from the scope and spirit of the present invention, which is limited only by the claims that follow.

The invention claimed is:

1. A method for encoding a three-dimensional stereoscopic video signal, the method comprising the steps of:

receiving a first digital video signal representative of a first succession of frames containing left views of a scene, said first succession of frames including a left current frame a left forward frame, and a left backward frame;

receiving a second digital video signal representative of a second succession of frames containing right views of a scene, said second succession of frames including a right current frame, a right forward frame, and a right backward frame;

selecting a current frame from either said first or second succession of frames as a reference frame;

producing a first disparity estimate signal representing a prediction between said reference frame and either said left or said right forward frame;

producing a second disparity estimate signal representing a prediction between said reference frame and either said left or said right backward frame;

employing said first and said second disparity estimate signals to encode said first and said second video signals to produce an encoded three-dimensional stereoscopic video signal.

\* \* \* \* \*